US009250848B2

(12) United States Patent
Morrison et al.

(10) Patent No.: US 9,250,848 B2
(45) Date of Patent: Feb. 2, 2016

(54) DYNAMICALLY ADJUSTING THE COMPLEXITY OF WORKER TASKS IN A MULTI-THREADED APPLICATION

(71) Applicant: CANON KABUSHIKI KAISHA, Tokyo (JP)

(72) Inventors: Paul William Morrison, St. Clair (AU); Ekaterina Stefanov, Normanhurst (AU)

(73) Assignee: Canon Kabushiki Kaisha, Tokyo (JP)

(*) Notice: Subject to any disclaimer, the term of this patent is extended or adjusted under 35 U.S.C. 154(b) by 55 days.

(21) Appl. No.: 13/712,805

(22) Filed: Dec. 12, 2012

(65) Prior Publication Data
US 2013/0155456 A1   Jun. 20, 2013

(30) Foreign Application Priority Data
Dec. 14, 2011 (AU) .................................. 2011254039

(51) Int. Cl.
*G06F 3/12* (2006.01)
*G06F 9/50* (2006.01)

(52) U.S. Cl.
CPC .............. *G06F 3/1296* (2013.01); *G06F 3/124* (2013.01); *G06F 3/1214* (2013.01); *G06F 3/1288* (2013.01); *G06F 9/5083* (2013.01)

(58) Field of Classification Search
None
See application file for complete search history.

(56) References Cited

U.S. PATENT DOCUMENTS

| | | | |
|---|---|---|---|
| 6,304,866 B1 | 10/2001 | Chow et al. | |
| 6,604,200 B2 | 8/2003 | Zack et al. | |
| 7,415,559 B1 * | 8/2008 | Butterworth | G06F 9/4881 710/220 |
| 2009/0237697 A1 * | 9/2009 | Caruso | G06F 3/1204 358/1.13 |

* cited by examiner

*Primary Examiner* — King Poon
*Assistant Examiner* — Andrew H Lam
(74) *Attorney, Agent, or Firm* — Canon U.S.A., Inc. IP Division

(57) ABSTRACT

Disclosed are methods of allocating tasks for a print job in a multi-threaded system. One method determines a utilisation measure of at least one of a plurality of intermediate data generating threads, and a complexity limit of a intermediate data generation task. The complexity limit is decreased if the determined utilisation measure of the intermediate data generating thread is under a predetermined threshold. The complexity limit limits a processing load of the intermediate data generation task to be allocated to the intermediate data generating thread. The method then compares the processing load of the intermediate data generation task to be allocated with the determined complexity limit, and allocates the intermediate data generation task to the intermediate data generating thread for processing in an event that the processing load of the intermediate data generation task satisfies the complexity limit.

16 Claims, 17 Drawing Sheets

DYNAMICALLY ADJUSTING THE COMPLEXITY OF WORKER TASKS IN A MULTI-THREADED APPLICATION

REFERENCE TO RELATED PATENT APPLICATION

This application claims the benefit of foreign priority under 35 U.S.C. §119 to Australian Patent Application No. 2011254039, filed Dec. 14, 2011, hereby incorporated by reference in its entirety as if fully set forth herein.

TECHNICAL FIELD

The present invention relates generally to computer-based systems and, in particular, to the dynamic calculation of worker task complexity in a running multi-processor system.

BACKGROUND

The trend of achieving performance speedup through the use of multi-core and multi-processor architectures in computer systems, including printing systems, has gained widespread use in recent years. Multi-core and multi-processor architectures allow a number of threads belonging to one or more processes to execute in parallel across a number of CPUs, thereby reducing the overall execution time.

In order to take advantage of such parallelism, a process must typically be broken down into "tasks". A task is a well-defined portion of the overall process to be performed on given input data to produce some output data. The tasks of a process should be largely independent and able to be executed in parallel.

Existing methods in the prior art attempt to dynamically change the size of the tasks processed by different CPUs. However, the prior art methods do not consider the state of the system, which may be changing frequently as the process is executed.

In prior art methods, a print driver determines the appropriate level of granularity for rendering a particular print job using the available processors and characteristics of the print job. Granularity may be at the level of complete pages, groups of graphical objects, or bands of the page. Granularity may change many times during the processing of a job depending on the job being processed. Thus, the whole job has to be received before the granularity of the job is decided. Furthermore, whether resources are well-utilised at any point in time (the state of the system) is not considered.

SUMMARY

According to one aspect of the present disclosure there is provided a method of allocating tasks for rendering a page based on a print job in a multi-threaded system. The method includes receiving at least one graphical object from the print job to produce an intermediate data generation task, determining a utilisation measure of at least one of a plurality of intermediate data generating threads, determining a complexity limit to limit a processing load of the intermediate data generation task to be allocated to the intermediate data generating thread, the complexity limit being decreased if the determined utilisation measure of the intermediate data generating thread is below a predetermined threshold, comparing a processing load of the intermediate data generation task to be allocated with the determined complexity limit, and allocating the intermediate data generation task to the intermediate data generating thread for processing in an event that the processing load of the intermediate data generation task satisfies the complexity limit.

In a further aspect, a method is disclosed of allocating tasks for rendering a page based on a print job in a multi-threaded rendering system, the method including receiving at least one graphical object from the print job to produce a worker task to be allocated, determining a utilisation measure of at least one of the plurality of worker threads, determining a complexity limit to limit a processing load of a worker task to be allocated to the worker thread, the complexity limit being decreased if the determined utilization measure of the worker thread is below a predetermined threshold, comparing a processing load of the worker task to be allocated with the determined complexity limit, and allocating the worker task satisfying the determined complexity limit to the worker thread in an event that the processing load of the worker task satisfies the determined complexity limit Other aspects are also disclosed.

BRIEF DESCRIPTION OF THE DRAWINGS

At least one embodiment of the present invention will now be described with reference to the following drawings, in which:

FIG. 5b shows the pixel-aligned object edges, and their associated fills, of the page of FIG. 5a;

FIG. 5c shows a fillmap representation of the page of FIG. 5a;

FIG. 5d shows a tiled fillmap representation of the page of FIG. 5a;

FIG. 11d represents a result of applying the presently disclosed arrangements to the situation of FIG. 11a.

DETAILED DESCRIPTION INCLUDING BEST MODE

Figure 1:
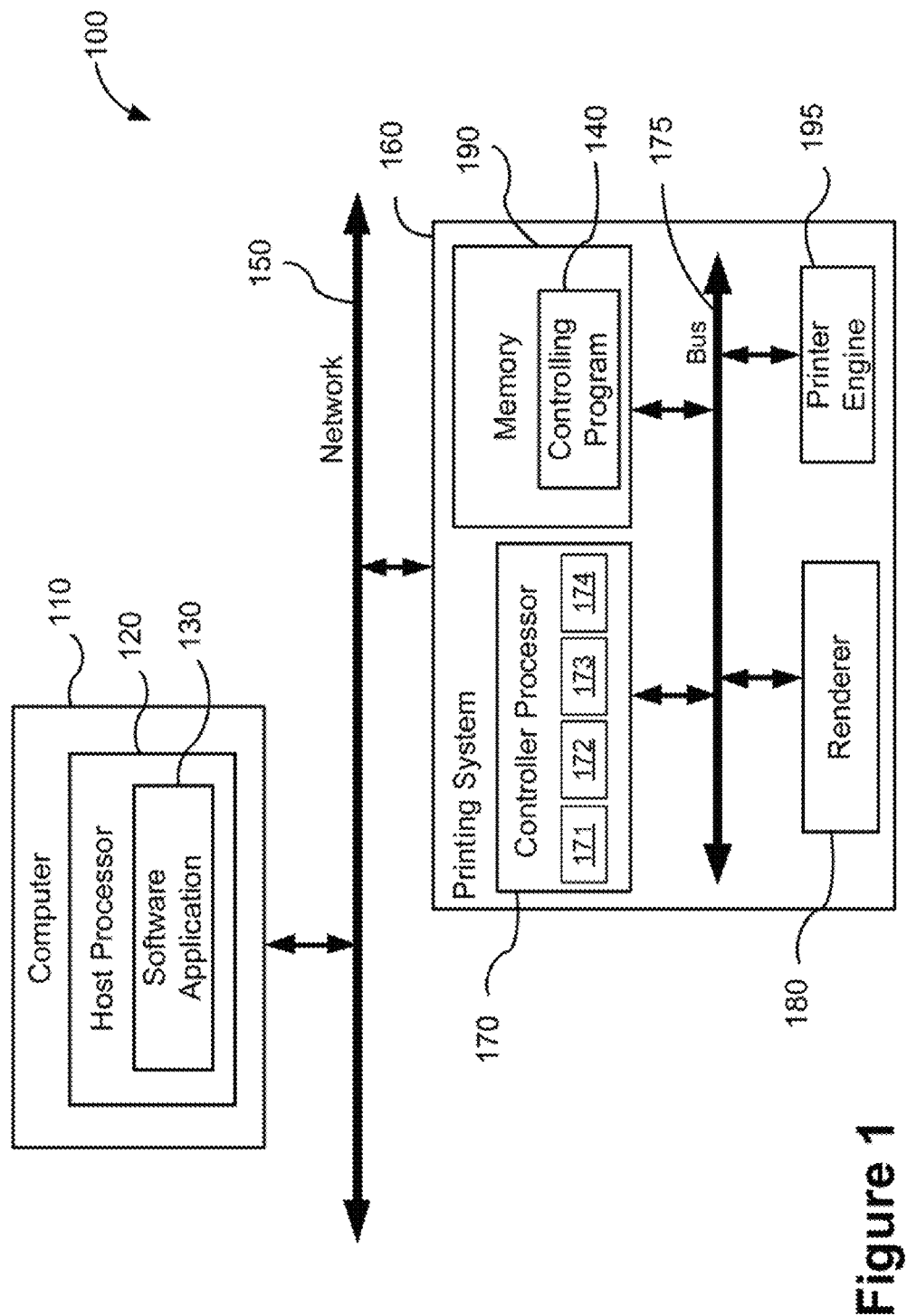
FIG. 1 shows a schematic block diagram of a multi-processor printing system for rendering the graphic objects of a page according to the present disclosure.

A major consideration in splitting or otherwise dividing a process into tasks is the complexity of those tasks, as the splitting often directly impacts system performance. Complexity refers to the amount of processing work or processing load required for a given task. There are many methods of measuring complexity, such as the number of CPU instructions required to complete a task. Complexity is linked to the duration of the task and the granularity of a number of tasks. Complexity is often estimated based on the input to a task. For example, in a database scenario complexity might be based on the number of rows in a database query. In a printing scenario, complexity might be based on the number of graphic objects in an area of a page. A single print job comprises at least a single page, and often multiple pages. Complexity may be considered on a page basis or on a job basis. In some instances, it may be appropriate to consider complexity for a portion of a page, such as a region, or a band in a band printing environment. Ultimately however, the assessment and management of complexity is desired to optimise printing efficiency and thus job throughput.

The complexity that provides the best performance may change as the process is executed. For example, it may be better to have a large number of low-complexity tasks at one point in time, and a smaller number of high-complexity tasks at another point in time. A method of dynamically determining complexity in a running process is therefore desired.

In a printing scenario, a computer application typically provides a printable page to a printing system for printing to a print medium, such as a paper sheet. A printable page may be part of a document having many pages. A printable page contains all information necessary for printing that page. The printable page is typically provided in the form of a description of the page to be printed, specified using a high-level Page Description Language (PDL), such as Adobe® PDF or Hewlett-Packard® PCL. The PDL provides descriptions of graphic objects to be rendered onto the page in a rendering order (z-order).

A Raster Image Processor (RIP) is typically required to convert the high-level PDL description of a page to a raster representation. A high-level PDL description of a page contains graphic objects such as text, lines, fill regions, and image data. A raster representation of the page is made up of colour pixel data. A printer engine will then typically print the raster representation of the page onto print media, such as paper. Before producing a raster representation, a RIP may produce an intermediate page representation of the page. An intermediate page representation of the page will typically be more compact than a raster representation, but can be quickly and easily converted to a raster representation.

A RIP process in a multi-core or multi-processor printing system may comprise tasks for interpreting printable pages in the form of PDLs, generating display lists of graphic objects, generating intermediate page representations, merging intermediate page representations, and rendering intermediate page representations to pixels. In such a process, tasks are processed while graphic objects are still being read from a PDL, and the process has no knowledge of graphic objects that remain to be read. Therefore, there is a need to dynamically determine the best complexity of tasks in a RIP process while graphic objects are still being read from a PDL.

In the following description, the terms "complexity" and "duration" refer to the amount of processing work performed by each task and the time taken to perform that processing. These terms are often used interchangeably. The term "granularity" is also closely related to task complexity and duration. The limit set for the maximum amount of processing to be performed by a task is called "complexity limit" in this description.

FIG. 1 shows a schematic block diagram of a pixel rendering system 100 for rendering graphic objects which are processed in accordance with a preferred implementation of the present disclosure. The pixel rendering system 100 comprises a computer 110 connected to a printer system 160 through a network 150. The network 150 may be a typical network involving multiple computers, or may be a simple connection between a single computer 110 and a printing system 160.

The computer 110 comprises a host processor 120 for executing the software application 130, such as a word processor or graphical software application.

The printing system 160 comprises a multi-core controller processor 170, having in this case four processor cores 171, 172, 173 and 174, for executing a controlling program 140 which is stored in a memory 190. The printing system 160 also has a renderer 180, and a printer engine 195 coupled via a bus 175. The renderer 180 is preferably implemented as an ASIC coupled via the bus 175 to each of the controller processor 170, memory 190, and the printer engine 195. However, the renderer 180 may alternatively be implemented in software that is executed in the controller processor 170. In some implementations the renderer 180 may be implemented as a combination of software and specialist hardware. The renderer 180 renders the intermediate page representation resulting from the execution of the controlling program 140 to pixel data values. The pixel data values may then be stored in memory and reproduced as pixels by the printer engine 195, for example. The controlling program 140 will later be described with reference to FIG. 2.

The controlling program 140 is executed by the controller processor 170 in one or more threads of execution. A thread consists of a number of instructions or steps that are executed in sequence by one of processor cores 171-174. At any given point in time, a thread will be executing one of the tasks of the controlling program 140 or, if there are no tasks available to execute, the thread will be idle. Additional threads may also be executed by the controller processor 170. These threads may include the threads of an operating system that may also be running on the controller processor 170. These additional threads may be executed by one of the processor cores 171-174, or by any additional processor cores that are not used to execute threads associated with the task desired to be optimised, being printing in the present example. In general, one or more threads can be assigned to a processor core, but in preferred implementations, only one thread is assigned to a processor core. This assignment does not change throughout execution. That is, a given thread always runs on the same processor core, a concept known in the art as thread affinity.

Figure 2:
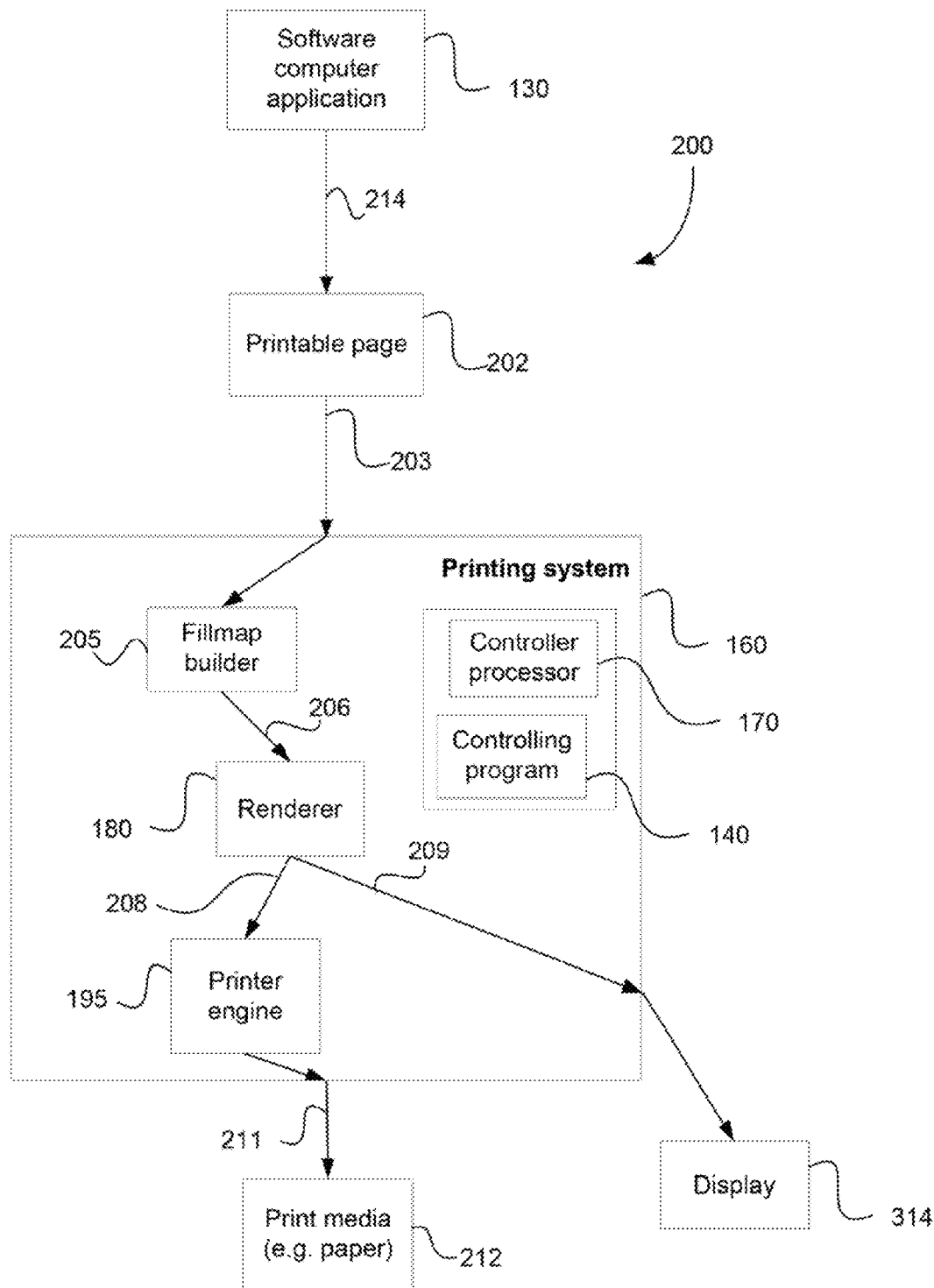
FIG. 2 shows how a software computer application provides a printable page to a printing device for printing to a hard copy medium such as a paper sheet according to the present disclosure.

FIG. 2 shows a process 200 of printing a printable page 202 using the printing system 160. A software computer application 130, for example executing on the computer 110, provides a printable page 202 to the printing system 160 for printing to a print media 212, such as a paper sheet. The printable page 202 is typically provided in the form of a description 214 of the page to be printed, the description 214 being specified using a Page Description Language (PDL), such as Adobe® PDF or Hewlett-Packard® PCL. The PDL provides descriptions of data items such as graphic objects to be rendered onto the page in a rendering (or z) order, as opposed to a raster image (i.e. a bitmap of pixel values) of the page to be printed. The printable page 202 may be the whole or part of a print job created by the application 130 executing in the computer 110.

The printing system 160 receives the description of the page to be printed 202 and generates an intermediate representation 206 of the page 202, using a fillmap builder 205. The printing system 160 then uses the renderer 180 to render the intermediate representation 206 of the page 202 to a raster image representation 208 comprising pixel data which is printed to the print media 212, such as paper, using a print engine 195. Another raster image representation 209 may also be sent to a display 314 for reproduction of the pixel data as pixels on a display screen. In general, storage of the intermediate representation 206 of the page 202 consumes less of the memory 190 than storage of the raster image representation 208.

In some prior art printing devices, the intermediate representation 206 of the page 202 is rendered to pixel data in real-time by the renderer 180, this being the rate at which the output device, be it the printer engine 195 or the display 314, reproduces output pixels. Real-time rendering is particularly important for video displays, where animation frame rates must be met to ensure fluidity of motion. Real-time rendering in a printing environment is important to ensure compliance with page throughput rates of a print engine.

The intermediate page representation 206 is typically generated by a controlling program 140 which is executed by a controller processor 170 within the printing system 160. In such implementations, the controlling program 140 therefore embodies the process or method steps of the fillmap builder 205. The fillmap builder 205 will be described in more detail later with reference to FIG. 4. The controller processor 170 may be implemented as a multi-core processor, as illustrated in FIG. 1. The intermediate page representation 206 is transferred to the renderer 180, which renders the intermediate page representation to pixel data 208. The pixel data 208 is then reproduced as pixels onto the print media 212 using the printer engine 195 which may, for example, be an electrophotographic engine. The aforementioned description relates to various functional modules such as the fillmap builder 205. Such modules can be implemented in hardware, software, or a hybrid mix of hardware and software.

Figure 3A:
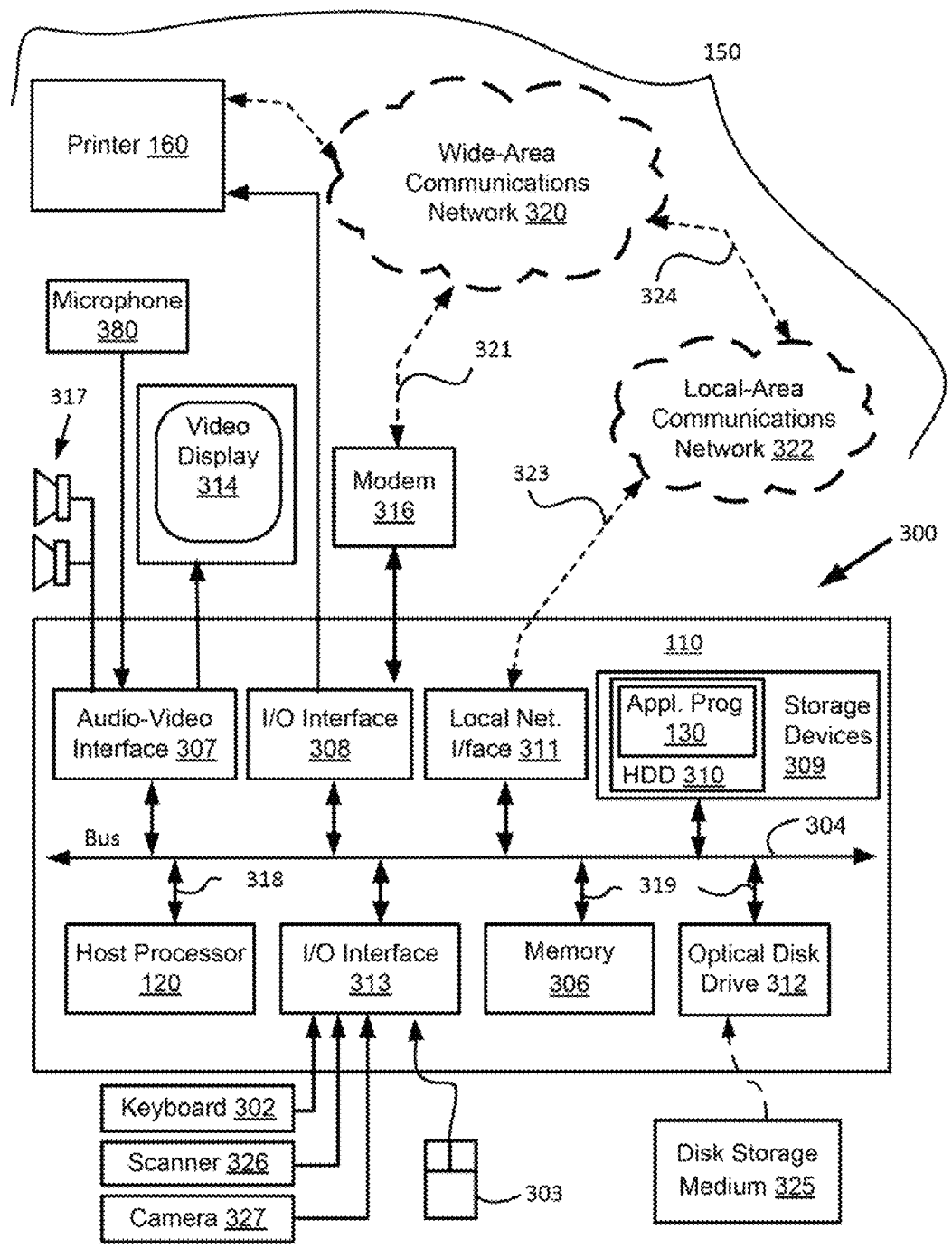
FIGS. 3a and 3b collectively form a schematic block diagram of a general purpose computer system in which the arrangements of FIGS. 1 and 2 may be implemented.
Figure 3B:
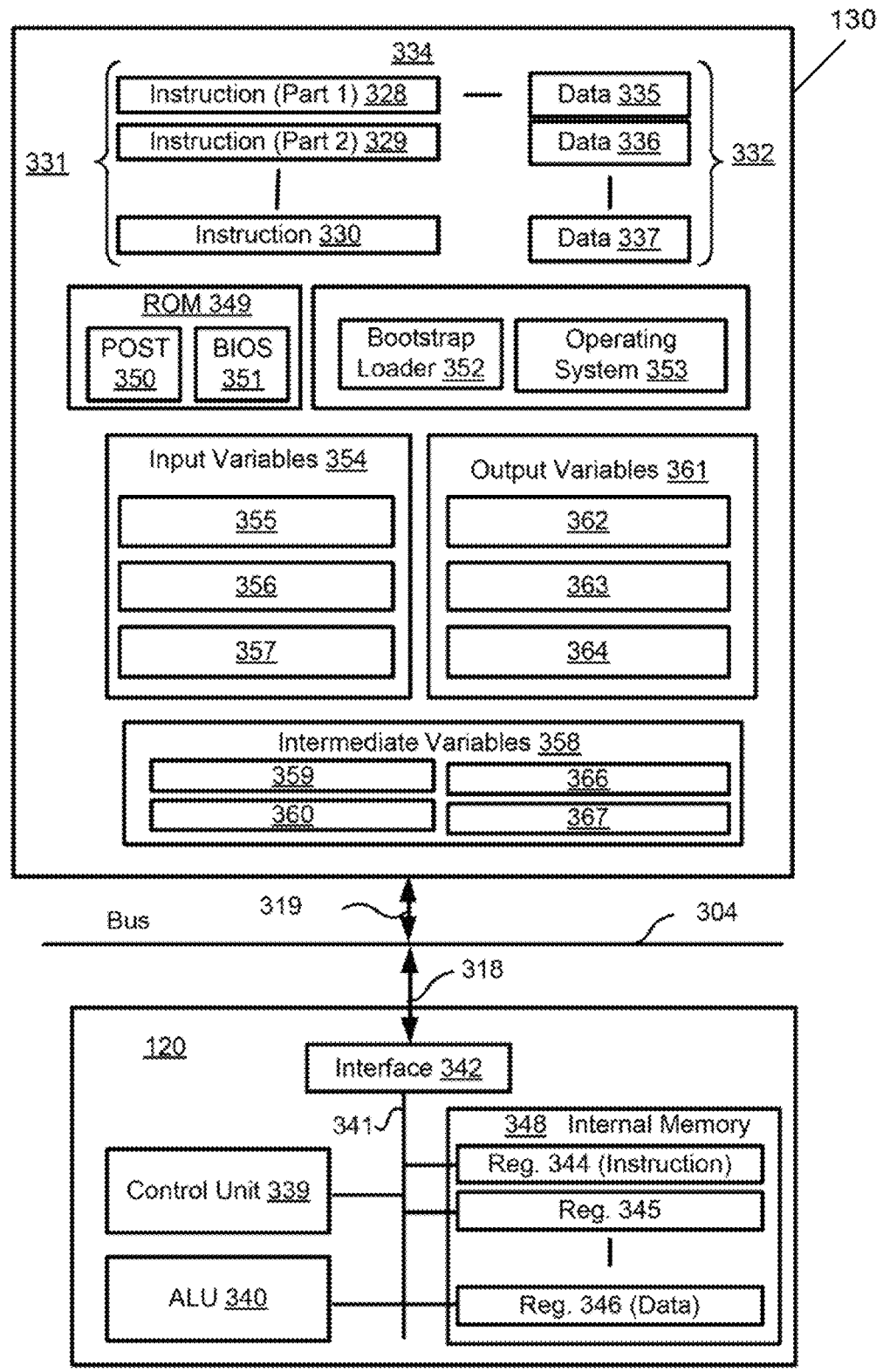

FIG. 3a and FIG. 3b depict a general-purpose Computer System 300, upon which the various arrangements described can be practiced.

As seen in FIG. 3a, the Computer System 300 includes: the Computer Module 110; input devices such as a Keyboard 302, a Mouse Pointer Device 303, a Scanner 326, a Camera 327, and a Microphone 380; and output devices including the printing system 160, the Display device 314 and Loudspeakers 317. An external Modulator-Demodulator (Modem) transceiver device 316 may be used by the Computer Module 110 for communicating to and from a Communications Network 320 via a Connection 321. The Communications Network 320 may be a wide-area network (WAN), such as the Internet, a cellular telecommunications network, or a private WAN. Where the connection 321 is a telephone line, the Modem 316 may be a traditional "dial-up" modem. Alternatively, where the Connection 321 is a high capacity (e.g., cable) connection, the Modem 316 may be a broadband modem. A wireless modem may also be used for wireless connection to the Communications Network 320. The components 320-324 may be considered equivalent to, and an example of, the Network 150 of FIG. 1 to which the printing system 160 couples, as also seen in FIG. 3a.

The Computer Module 110 typically includes at least one Host Processor 120, and a Memory 306. For example, the Memory 306 may have semiconductor random access memory (RAM) and semiconductor read only memory (ROM). The Computer Module 110 also includes an number of input/output (I/O) interfaces including: an Audio-Video Interface 307 that couples to the Video Display 314, the Loudspeakers 317 and the Microphone 380; an I/O interface 313 that couples to the Keyboard 302, the Mouse 303, the Scanner 326, the Camera 327 and optionally the joystick or other human interface device (not illustrated); and an I/O Interface 308 for the Modem 316 and the printing system 160. In some implementations, the Modem 316 may be incorporated within the Computer Module 110, for example within the I/O Interface 308. The Computer Module 110 also has a Local Network Interface 311, which permits coupling of the Computer System 300 via a Connection 323 to a Local-Area Communications Network 322. As illustrated in FIG. 3a, the Local-Area Communications Network 322 may also couple to the Wide-Area Communications Network 320 via the Connection 324, which would typically include a so-called "firewall" device or device of similar functionality. The Local Network Interface 311 may comprise an Ethernet circuit card, a Bluetooth™ wireless arrangement or an IEEE 802.11 wireless arrangement; however, numerous other types of interfaces may be practiced for the Local Network Interface 311.

The I/O interfaces 308 and 313 may afford either or both of serial and parallel connectivity, the former typically being implemented according to the Universal Serial Bus (USB) standards and having corresponding USB connectors (not illustrated). Storage Devices 309 are provided and typically include a hard disk drive, HDD 310. Other storage devices such as a floppy disk drive and a magnetic tape drive (not illustrated) may also be used. An Optical Disk Drive 312 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 300.

The components 120 to 313 of the Computer Module 110 typically communicate via a Bus 304 and in a manner that results in a conventional mode of operation of the Computer System 300 known to those in the relevant art. For example, the Host Processor 120 is coupled to the Bus 304 using a connection 318. Likewise, the memory 306 and Optical Disk Drive 312 are coupled to the Bus 304 by Connections 319. Examples of computers on which the described arrangements can be practised include IBM-PC's and compatibles, Sun SPARC stations, Apple Mac™ or like computer systems.

The Software Application 130 is executable within the Computer System 300. In particular, the steps of the Software Application 130 are effected by Software Instructions 331 (see FIG. 3b) in the Software Application 130 that are carried out within the Computer System 300. The Software Instructions 331 may be formed as one or more code modules, each for performing one or more particular tasks. The software 130 may also be divided into two separate parts, in which a first part and the corresponding code modules performs a desired application (e.g. word processing or graphical imaging) and a second part and the corresponding code modules manage a user interface between the first part and the user.

The Software Application 130 may be stored in a computer readable medium, including the storage devices described below, for example. The software 130 is loaded into the Computer System 300 from the computer readable medium, and then executed by the Computer System 300. A computer readable medium having such software or computer program recorded on the computer readable medium is a computer program product. The use of the computer program product in the computer system 300 effects apparatus for generating printable pages.

The software Application 130 is typically stored in HDD 310 or the memory 306. The software is loaded into Computer System 300 from a computer readable medium, and executed by the Computer System 300. Thus, for example, the Software Application 130 may be stored on an optically readable disk storage medium (e.g., CD-ROM) 325 that is read by the Optical Disk Drive 312. A computer readable medium having such software or computer program recorded on it is a computer program product. The use of the computer program product in the Computer System 300 preferably effects an apparatus for generating printable pages.

In some instances, the Software Application 130 may be supplied to the user encoded on one or more CD-ROMs 325 and read via the corresponding drive 312, or alternatively may be read by the user from the Wide-Area Communications Network 320 or Local-Area Communications Network 322. Still further, the software 130 can also be loaded into the Computer System 300 from other computer readable media. Computer readable storage media refers to any storage medium that provides recorded instructions and/or data to the Computer System 300 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the Computer Module 110. Examples of computer readable transmission media that may also participate in the provision of software, application programs, instructions and/or data to the Computer Module 110 include radio or infra-red transmission channels as well as a network connection to another computer or networked device, and the Internet or Intranets including e-mail transmissions and information recorded on Websites and the like.

The second part of the Software Application 130 and the corresponding code modules mentioned above may be executed to implement one or more graphical user interfaces (GUIs) to be rendered or otherwise represented upon the Video Display 314. Through manipulation of typically the Keyboard 302 and the Mouse 303, a user of the Computer System 300 and the application 130 may manipulate the interface in a functionally adaptable manner to provide controlling commands and/or input to the applications associated with the GUI(s). Other forms of functionally adaptable user interfaces may also be implemented, such as an audio interface utilizing speech prompts output via the Loudspeakers 317 and user voice commands input via the microphone 380.

FIG. 3b is a detailed schematic block diagram of the Host Processor 120 and a "memory" 334. The memory 334 represents a logical aggregation of all the memory modules (including the HDD 309 and semiconductor memory 306) that can be accessed by the computer module 110 in FIG. 3a.

When Computer Module 110 is initially powered up, a power-on self-test (POST) program 350 executes. The POST program 350 is typically stored in a ROM 349 of the semiconductor memory 306 of FIG. 3a. A hardware device such as the ROM 349 storing software is sometimes referred to as firmware. The POST program 350 examines hardware within the Computer Module 110 to ensure proper functioning and typically checks the Host Processor 120, the Memory 334 (309, 306), and a basic input-output systems software (BIOS) module 351, also typically stored in the ROM 349, for correct operation. Once the POST program 350 has run successfully, the BIOS 351 activates the hard disk drive 310 of FIG. 3a. Activation of the hard disk drive 310 causes a bootstrap loader program 352 that is resident on the hard disk drive 310 to execute via the Host Processor 120. This loads an Operating System 353 into the RAM memory 306, upon which the operating system 353 commences operation. The operating system 353 is a system level application, executable by the Host Processor 120, to fulfill various high level functions, including processor management, memory management, device management, storage management, software application interface, and generic user interface.

The Operating System 353 manages the Memory 334 (309, 306) to ensure that each process or application running on the computer module 110 has sufficient memory in which to execute without colliding with memory allocated to another process. Furthermore, the different types of memory available in the system 300 of FIG. 3a must be used properly so that each process can run effectively. Accordingly, the aggregated memory 334 is not intended to illustrate how particular segments of memory are allocated (unless otherwise stated), but rather to provide a general view of the memory accessible by the Computer System 300 and how such is used.

As shown in FIG. 3b, the Host Processor 120 includes a number of functional modules including a Control Unit 339, an arithmetic logic unit (ALU) 340, and a local or Internal Memory 348, sometimes called a cache memory. The Internal Memory 348 typically includes a number of storage registers 344-346 in a register section. One or more internal busses 341 functionally interconnect these functional modules. The Host Processor 120 typically also has one or more interfaces 342 for communicating with external devices via Bus 304, using a connection 318. The memory 334 is coupled to Bus 304 using a connection 319.

The Software Application 130 includes a sequence of instructions 331 that may include conditional branch and loop instructions. The Software Application 130 may also include data 332 which is used in execution of the Software Application 130. The instructions 331 and the data 332 are stored in memory locations 328, 329, 330 and 335, 336, 337, respectively. Depending upon the relative size of Program Instructions 331 and the memory locations 328-330, a particular instruction may be stored in a single memory location as depicted by the instruction shown in the memory location 330. Alternately, an instruction may be segmented into a number of parts each of which is stored in a separate memory location, as depicted by the instruction segments shown in the memory locations 328 and 329.

In general, the Host Processor 120 is given a set of instructions which are executed therein. The Host Processor 120 waits for a subsequent input, to which the Host Processor 120 reacts to by executing another set of instructions. Each input may be provided from one or more of a number of sources, including data generated by one or more of the input devices 302, 303, data received from an external source across one of the networks 320, 322, data retrieved from one of the storage devices 306, 309 or data retrieved from the storage medium 325 inserted into the corresponding reader 312, all depicted in FIG. 3a. The execution of a set of the instructions may in some cases result in output of data. Execution may also involve storing data or variables to the memory 334.

The disclosed arrangements may use Input Variables 354, which are stored in Memory 334 in corresponding memory locations 355, 356, 357. The arrangements may produce Output Variables 361, which are stored in the memory 334 in corresponding memory locations 362, 363, 364. Intermediate Variables 358 may be stored in memory locations 359, 360, 366 and 367.

Referring to the Host Processor 120 of FIG. 3b, the registers 344, 345, 346, the arithmetic logic unit, ALU 340, and the Control Unit 339 work together to perform sequences of micro-operations needed to perform "fetch, decode, and execute" cycles for every instruction in the instruction set making up the Software Application 130. Each fetch, decode, and execute cycle comprises:

(a) a fetch operation, which fetches or reads an instruction 331 from a memory location 328, 329, 330;

(b) a decode operation in which the control unit 339 determines which instruction has been fetched; and (c) an execute operation in which the control unit 339 and/or the ALU 340 execute the instruction.

Thereafter, a further fetch, decode, and execute cycle for the next instruction may be executed. Similarly, a store cycle may be performed by which the Control Unit 339 stores or writes a value to Memory Location 332.

Each step or sub-process in the processes described is typically associated with one or more segments of the Software Application 130 and is performed by the register section 344, 345, 347, the ALU 340, and the control unit 339 in the processor 120 working together to perform the fetch, decode, and execute cycles for every instruction in the instruction set for the noted segments of the Software Application 130.

Operation of the printing system 160 is similar to that of the computer 110 in terms of storage and execution of the controlling program 140 by the memory 190 and the controller processor 170 respectively, noting however that the controlling program 140 is multi-threaded with distinct program threads executing on corresponding ones of the multiple processor cores 171-174 making up the controller processor 170. As such the foregoing description of the computer 110 is generally applicable to the printing system 160. Specifically, the controlling program 140 is typically stored on a memory drive (not illustrated) which may be a hard disc or semiconductor hard drive. Further the program 140 may be loaded via an interface connection (not illustrated, but for example a USB port) or via the network 150.

Returning to FIG. 1, in the pixel rendering system 100, the software application 130 creates printable pages for printing such as printable page 202, where a printable page 202 often contains graphic objects such as text, lines, fill regions, and image data. The software application 130 sends a high-level description of the printable page (for example a PDL file) via the network 150 to the controlling program 140 that is executed in the controller processor 170 of the printing system 160. A printable page contains all information required by the pixel rendering system 100 to RIP, render, and print the page.

It is noted that the methods of dynamic adjustment of complexity of worker tasks to be described may be implemented in many systems, including the system shown in FIG. 1. For example, the printing system 160, and in particular the controller processor 170 and controlling program 140, may exist in separate servers or distributed network of servers. In such systems, the intermediate page representation produced by the controlling program 140 is sent to the renderer 180 via a network rather than a bus 175.

The arrangements to be described may be implemented as part of other multi-threaded processes. As such the scope of the present disclosure is not limited to printing systems or graphics processing systems.

The controlling program 140 receives a description of the printable page to be printed 202 from the software application 130, and performs the fillmap building process 205 to generate the intermediate representation 206 of the printable page 202. The controlling program 140 creates and executes a number of tasks in order to generate the intermediate page representation 206. Each task completes a portion of the RIP process for a given printable page, and is executed by a single processor core such as the cores 171, 172, 173 and 174. The controlling program 140, as executed by the controller processor 170, is also responsible for instructing the renderer 180 to render the intermediate page representation 206 of the printable page 202 to pixel data 208, and for instructing the printer engine 195 to print the pixel data 208 onto print media, such as paper 212.

Fillmap Builder

The fillmap builder 205 will now be described in more detail with reference to FIG. 4. The fillmap builder 205 contains or otherwise implements a preferred implementation of creating worker tasks according to the present disclosure. The purpose of the fillmap builder 205 is to create (build) fillmaps which are intermediate representations (intermediate data) of a page or parts of a page within a RIP system.

As described earlier with reference to FIG. 2, the fillmap builder 205 receives a printable page 202 in the form of a PDL 203. As seen in FIG. 4, one or more DL (display list generation) tasks 401-403 interpret the PDL representing the printable page 202 in a manner specific to the type of PDL. For example, a PDL in the form of Adobe® PDF will require different interpreting steps to those of a PDL in the form of Hewlett-Packard® PCL. However, no matter the form of PDL, the DL tasks 401-403 produce a sequence of graphic objects in an order known in the art as z-order.

Figure 4:
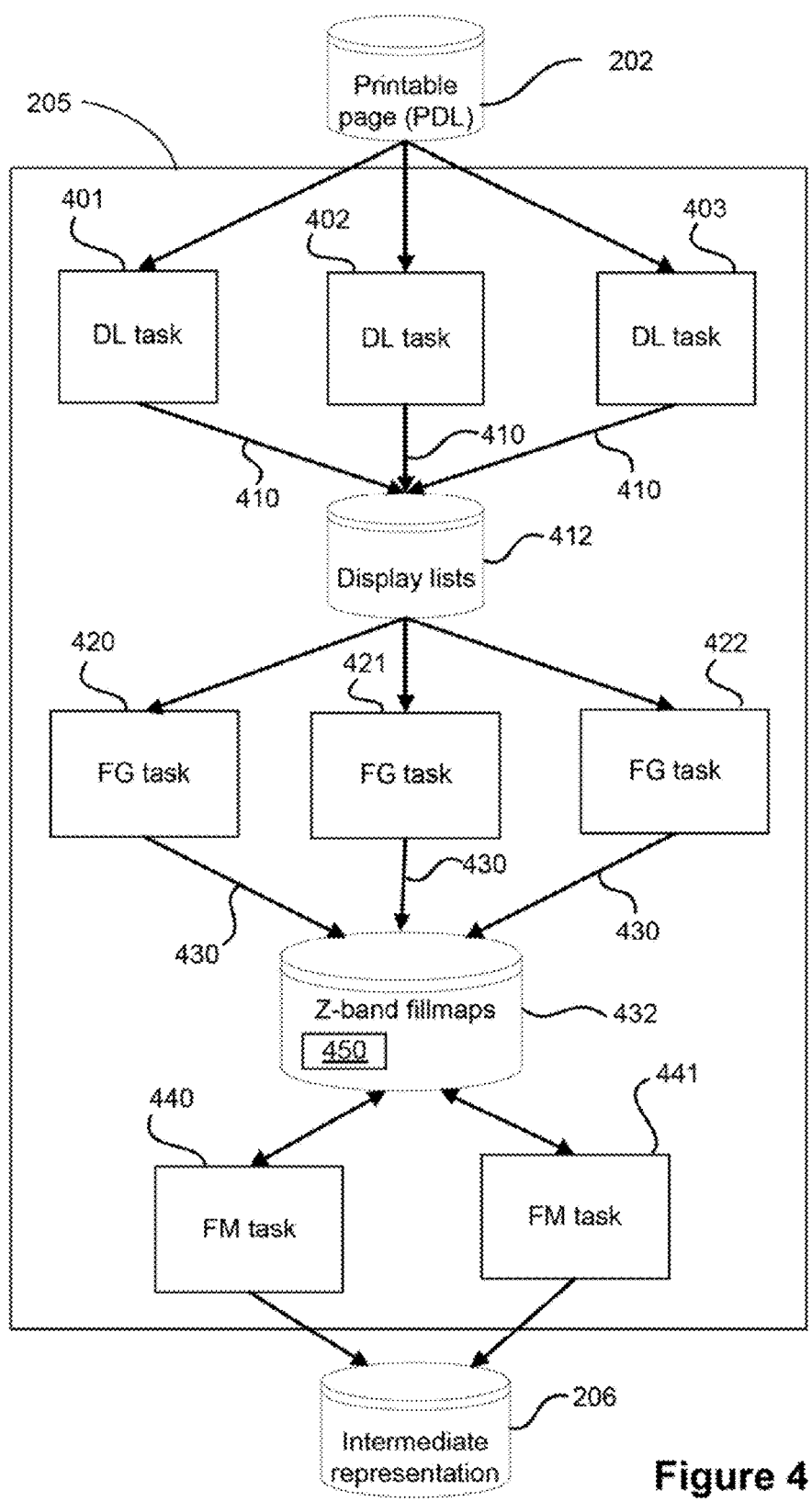
FIG. 4 shows the data and tasks used to process a printable page within the fillmap builder of FIG. 2.

From the sequence of graphic objects, each DL task 401-403 produces a z-band display list 410, where the display lists 410 may be stored to the memory 190, depicted at FIG. 4 as Display lists 412. Each display list 410 contains a sequence of graphic objects with consecutive z-order, sorted by the first scan lines on which the graphic objects appear. The main steps of the creation (generation) of worker tasks are implemented mainly within the DL tasks 401-403. The sequence of steps executed by a DL task will be described in more detail later with reference to FIG. 9. An example of splitting the graphic objects of a printable page 202 into one or more z-bands will be described later with reference to FIGS. 6a and 6b.

For each z-band display list 410, a corresponding FG (fillmap generation) task 420-422 (intermediate data generation tasks) is created. In the example shown in FIG. 4, the DL tasks 401-403 have split the graphic objects of the printable page 202 into three z-band display lists 410. Therefore, three FG tasks 420-422 are created. Each FG task 420-422 receives a display list 410 and converts that display list 410 to a z-band fillmap 430 as intermediate data. The fillmaps 430 are temporarily stored in the memory 190 as depicted at 432. For example, FG task 420 receives the z-band display list produced by DL task 401 and produces a z-band fillmap representing the same sequence of graphic objects. The fillmap generation process executed by an FG task 420-422 will be described in more detail later with reference to FIGS. 5a-5d.

The z-band fillmaps 430 generated by the FG tasks 420-422 (intermediate data generation tasks) represent intermediate representations of z-bands of the printable page 202. In order to produce the intermediate representation 206 that represents the entire printable page 202, one or more FM (fillmap merge) tasks 440-441 to merge z-band fillmaps (intermediate data) 430 generated from FG tasks 420-422 are required if FG tasks 420-422 are produced separately for a page. Each FM task 440-441 receives two or more z-band fillmaps 430 and merges them into a single fillmap, which is another z-band fillmap 430. This merged z-band fillmap 430 is then stored back into memory 432 in anticipation of additional fillmap merging, this being indicated by the double arrowhead connectors between the memory 432 and the FM tasks 440-441. If there are no more z-band fillmaps left to merge, the final merge produces the final intermediate representation 206 of the printable page 202, which as depicted in FIG. 4, may also be stored to the memory 109.

For example, the FM task 440 merges the z-band fillmaps 430 produced by FG tasks 420 and 421, to produce another z-band fillmap 450. FM task 441 then merges the z-band fillmap 450 produced by FM task 440 with the z-band fillmap produced by FG task 422. As there are only three z-band display lists 410 produced by DL tasks 401-403, in this example FM task 441 produces the final intermediate representation 206 for the printable page 202. The fillmap merge process executed by an FM tasks 440-441 will be described in more detail later with reference to FIG. 7.

As described earlier with reference to FIG. 2, the controlling program 140, and therefore the fillmap builder 205, are executed by a multi-core controller processor 170. The tasks 401-403, 420-422 and 440-441 of the fillmap builder 205 are therefore executed in parallel by the processor cores 171-174 of the multi-core controller processor 170. While many of the tasks are able to execute in parallel, there are some dependencies between the tasks that must be satisfied. For example, because the printable page 202 is interpreted in z-order, DL tasks 401-403 are not able to execute in parallel, so their execution must be sequential. FG tasks are able to execute in parallel with all other tasks, but require a display list to have been produced by a DL task. Similarly, FM tasks are able to execute in parallel with all other tasks, but require two or more z-band fillmaps to have been already produced by FG tasks or other FM tasks.

Fillmap Generation

A fillmap representation of a page will now be described in more detail. A fillmap is a region-based representation of a page. The fillmap maps a region of pixels within the page to a fill sequence which will be composited to generate the colour data for each pixel within that fillmap region. Multiple fillmap regions within a fillmap can map to the same fill sequence. Fillmap regions within the fillmap do not overlap and therefore each pixel in the rendered page only belongs to a single fillmap region. Each fillmap region within the fillmap is defined by a set of pixel-aligned fillmap edges which activate the fill sequence associated with that fillmap region. Pixel-aligned fillmap edges:

(i) are monotonically increasing in the y-direction of the page;
(ii) do not intersect;
(iii) are aligned with pixel boundaries, meaning that each pixel-aligned fillmap edge consists of a sequence of segments, each of which follows a boundary between two contiguous pixels;
(iv) contain a reference field referring to the index of the fill sequence, within the table of fill sequences, required to be composited to render the fillmap region, to which the pixel-aligned fillmap edge belongs, to pixels; and
(v) activate pixels within a single fillmap region.

On any given scanline, starting at a pixel-aligned fillmap edge which activates a fillmap region, and progressing in the direction of increasing x, the fillmap region remains active until a second pixel-aligned fillmap edge which activates a further fillmap region is encountered. When the second pixel-aligned fillmap edge is encountered, the active fillmap region is deactivated, and the fillmap region corresponding to the second pixel-aligned fillmap edge is activated.

Within a fillmap, the fill sequence active within each fillmap region of pixels is stored in the table of fill sequences. A fill sequence is a sequence of z-ordered levels, where each level contains attributes such as a fill, the opacity of the level, a compositing operator which determines how to mix the colour data of this level with other overlapping levels, and the priority, or z-order, of the level. A fill sequence contains references to all the levels which contribute colour to the pixels within a fillmap region. The table of fill sequences contains all of the fill sequences required to render the page to pixels. The table of fill sequences does not contain duplicate instances of identical fill sequences. Hence, multiple fillmap regions within a fillmap which map to the same fill sequence, map to the same instance of the fill sequence within the table of fill sequences.

Figure 5A:
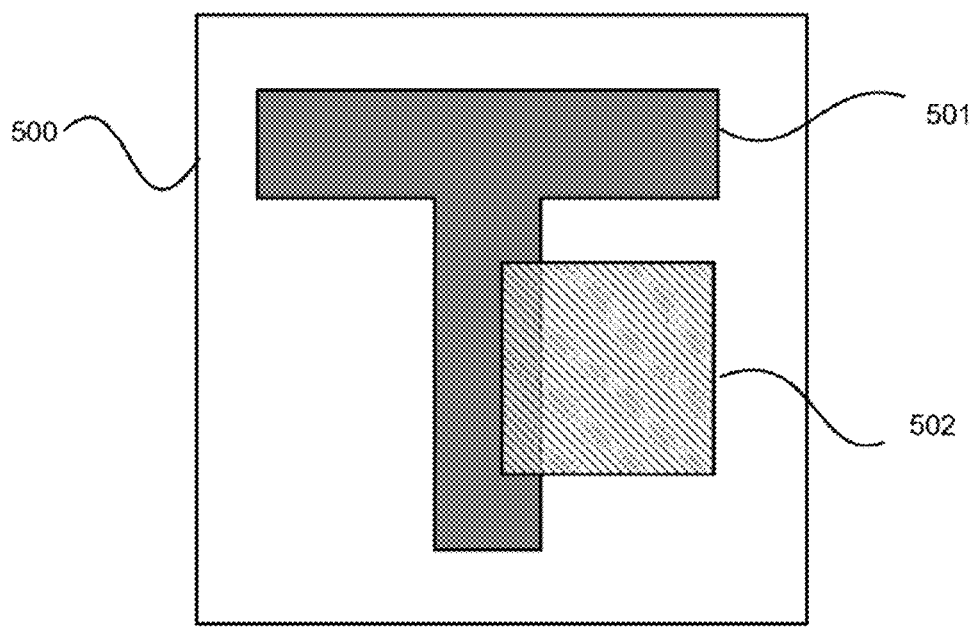
FIG. 5a shows an exemplary page with graphic objects.

The generation of a fillmap representation of a page will now be described with reference to FIGS. 5a to 5d. FIG. 5a shows a page representation 500. The page 500 has a white background and said page contains two graphic objects 501 and 502. The first graphic object 501 is an opaque "T" shaped object with a grey flat fill. The second graphic object 502 is a transparent square with a hatched fill. Examples of other fills are blends representing a linearly varying colour, bitmap images or tiled (i.e. repeated) images. The second graphic object 502 partially overlaps the first graphic object 501.

Figure 5B:
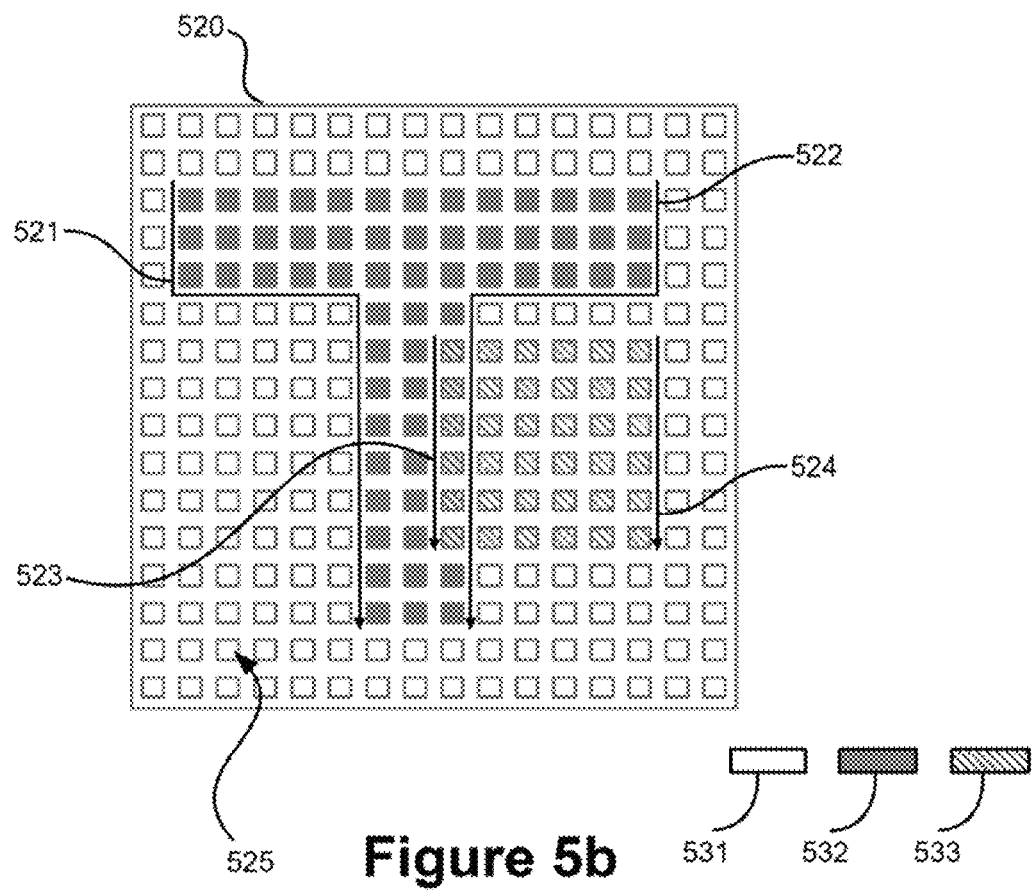

FIG. 5b shows the decomposition of the graphic objects 502 and 502 of the page 500 into pixel-aligned graphic object edges, levels and fills according to a pixel grid 520. A graphic object is decomposed into two or more pixel-aligned object edges, a single level, and one or more fills. Pixel-aligned graphic object edges define the activation or deactivation of a level during rasterization. Pixel-aligned graphic object edges therefore refer to the level of the object from which they are derived. The first graphic object 501 is decomposed into two pixel-aligned graphic object edges 521 and 522, and a level 532 that consists of a grey flat fill. Pixel-aligned graphic object edges 521 and 522 refer to the level 532 of the first graphic object 501. The second graphic object 502 is decomposed into two pixel-aligned graphic object edges 523 and 524, and a level 533 that consists of a transparent hatched fill. Pixel-aligned graphic object edges 523 and 524 refer to the level 533 of the second graphic object 502. The background 525 has a level 531 that consists of white fill.

Figure 5C:
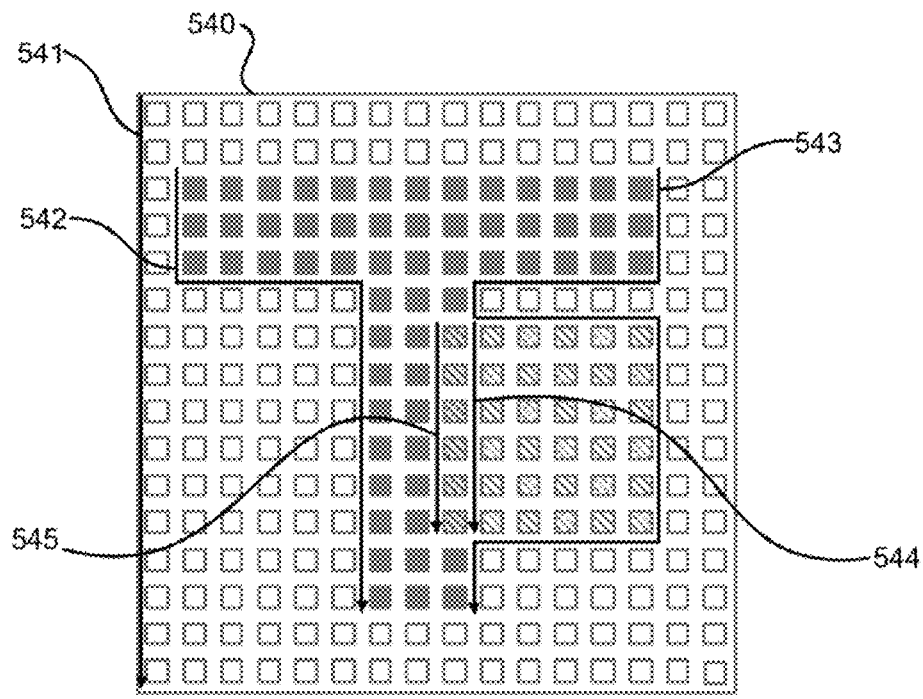

FIG. 5c shows a fillmap representation 540 of the page 500 represented in FIG. 5a. The fillmap representation 540 is composed of five pixel-aligned fillmap edges. Each pixel-aligned fillmap edge references a fill sequence which will be used to determine the colour of each of the pixels activated by that pixel-aligned fillmap edge. On any given scan line on which a pixel-aligned fillmap edge is active, the pixel-aligned fillmap edge will activate those pixels which are immediately to the right of the pixel-aligned fillmap edge, until the next pixel-aligned fillmap edge or a page boundary is encountered. The first pixel-aligned fillmap edge 541 traces the left hand boundary of the page, and references a fill sequence 551 which contains a single opaque level which is to be filled using the background fill. The second pixel-aligned fillmap edge 542 traces the left hand boundary of the first graphic object 501, and references a fill sequence 552 that contains a single level which is opaque and is to be filled using a grey flat fill. The third pixel-aligned fillmap edge 543 references the same fill sequence 551 as the first pixel-aligned fillmap edge 541. The fourth pixel-aligned fillmap edge 544 traces the left hand boundary of the region where the second object 502 overlaps the white background. The fourth pixel-aligned fillmap edge 544 references a fill sequence 554 which contains two levels. The top most level is transparent and is to be filled using a hatched fill. The bottom most level is opaque and is to be filled using the background fill. The fifth pixel-aligned fillmap edge 545 traces the left hand boundary of the region where the second graphic object 502 overlaps the first graphic object 501. The fifth pixel-aligned fillmap edge 545 references a fill sequence 553 which contains two levels. The top most level is transparent and is to be filled using a hatched fill. The bottom most level is opaque and is to be filled using a grey flat fill.

Accompanying the fillmap representation 540 of the page is a table of fill sequences which contains the fill sequences 551, 552, 553 and 554 referenced by the pixel-aligned fillmap edges contained in the fillmap representation 540 of the page.

Figure 5D:
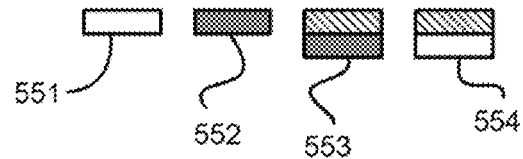
Figure 5D:
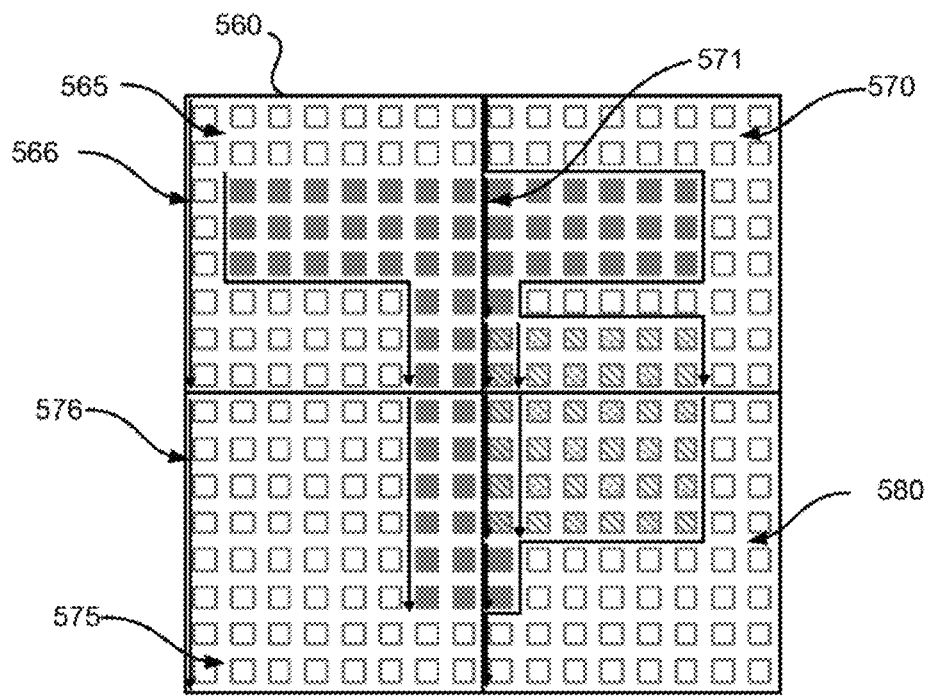

FIG. 5d shows a tiled fillmap representation 560 of the page represented in FIG. 5a. The tiled fillmap contains four tiles 565, 570, 575 and 580. Each tile has a height and width of eight pixels. In order to generate the tiled fillmap representation 560 of the page, the pixel-aligned fillmap edges of the original fillmap representation 540 have been split across fillmap tile boundaries. For example, the pixel-aligned fillmap edge 541 which traces the left hand boundary of the page in the untiled fillmap representation 540 shown in FIG. 5c has been divided into two pixel-aligned fillmap edges 566 and 576. The first pixel-aligned fillmap edge 566 activates pixels in the top-left hand tile 565, while the second pixel-aligned fillmap edge 576 activates pixels in the bottom-left hand tile 575. Also, new pixel-aligned fillmap edges have been inserted on the tile boundaries to activate the left most pixels of each tile which were previously activated by a pixel-aligned fillmap edge in a tile to the left of the tile in which the pixels reside. For example, in the top-right tile 570 a new pixel-aligned fillmap edge 571 has been inserted to activate pixels which were activated by the pixel-aligned fillmap edge 542 which traces the left hand boundary of the first graphic object 501 in the original fillmap representation 540 shown in FIG. 5c.

Z-banding

Figure 6A:
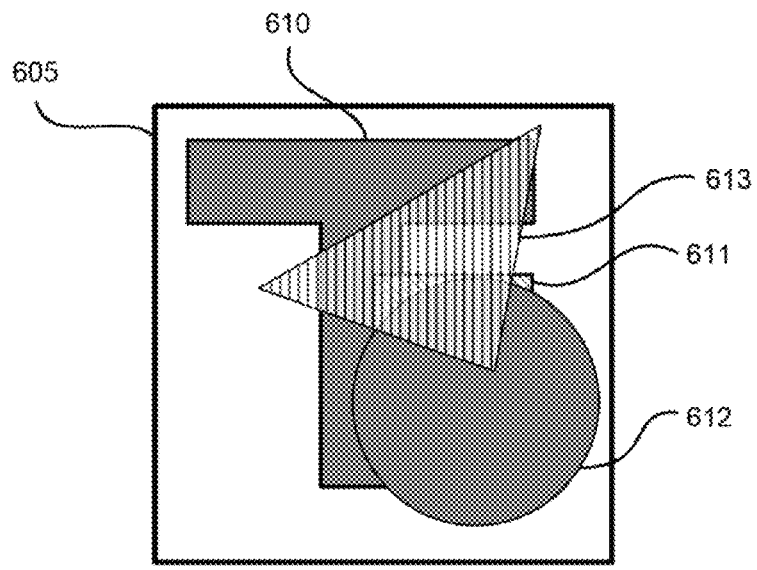
FIGS. 6a and 6b show collectively the splitting of a page of graphic objects into two z-bands.

As described earlier, many pages consist of a large number of graphic objects. In order to simplify fillmap generation, and to allow fillmap generation to execute in parallel on a multi-core processor, fillmap generation can be split into a number of independent FG tasks. Each FG task processes a z-band display list of graphic objects to produce a z-band fillmap. Groups of graphic objects with consecutive z orders are called z-bands. Each z-band is processed as one fillmap. The size of a z-band can be pre-set to some number of graphic objects, or determined during execution according to some criteria such as the complexity of an FG task needed to convert the graphic objects in the z-band to a fillmap. The determination of complexity is described later with reference to FIG. 9. Referring now to FIGS. 6a and 6c, the process of splitting a page of graphic objects into z-bands will now be described.

Figure 6B:
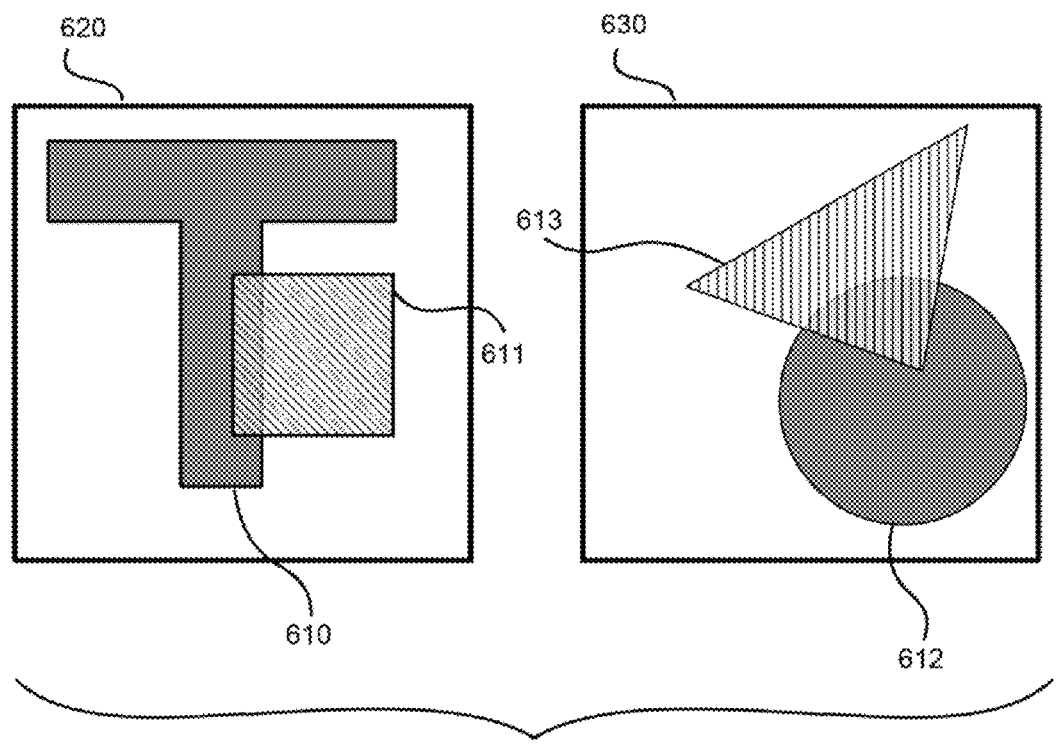

FIG. 6a shows a page 605 with four graphic objects, 610-613. Graphic object 610 has the smallest z-order, followed by graphic object 611 which has the next highest z-order, followed by graphic object 612, followed by graphic object 613 which has the highest z-order of all graphic objects 610-613. Graphic objects 610-613 of the page 605 are split into two z-bands 620 and 630 as shown in FIG. 6b. Z-band 620 contains the two graphic objects with smallest z-orders, being graphic object 610 and graphic object 611. Z-band 630 contains the two graphic objects with largest z-orders, being graphic object 612 and graphic object 613. As described previously with reference to FIG. 4, these two z-bands are processed by two FG tasks either sequentially or in parallel, to produce two z-band fillmaps. These z-band fillmaps are then merged (by an FM task) to produce a final fillmap for the page 605. In general, the number of fillmaps for a page varies depending on the page being rendered. The advantage of splitting a page of graphic objects into z-bands is that they are processed by multiple FG tasks that are able to be executed in parallel. In this way, a RIP takes advantage of multi-processor and multi-core systems, thereby speeding up the RIP process.

Fillmap Merging

Figure 7A:
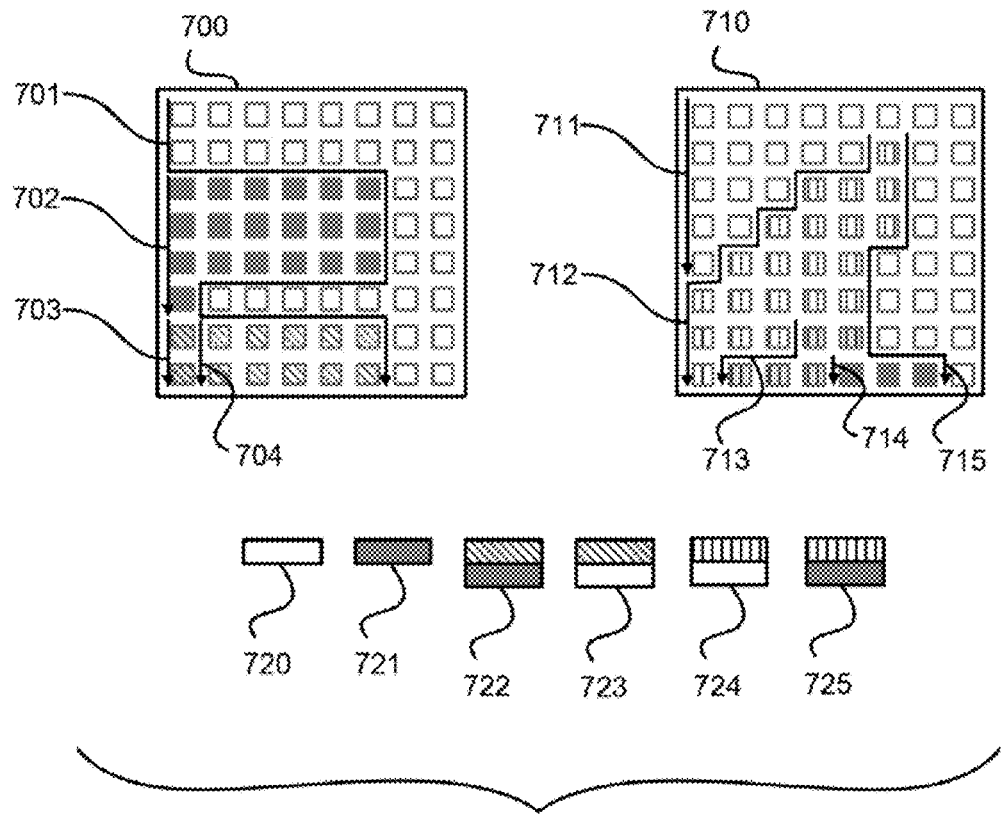
FIGS. 7a and 7b show collectively the merging of the two fillmap tiles, based on the z-bands shown in FIG. 6b.

An example of fillmap merging, as executed by an FM task, will now be described with reference to FIGS. 7a and 7b. Consider the two z-bands 620 and 630 as described previously with reference to FIG. 6. The upper-right fillmap tiles 700 and 710 of z-bands 620 and 630, respectively, are shown in FIG. 7a. These fillmap tiles are produced by the fillmap generation process as described previously with reference to FIG. 5. As fillmap tiles 700 and 710 are part of different z-band fillmaps 620 and 630, respectively, they are generated by different FG tasks.

For fillmap tile 700 of z-band 620, fillmap edge 701 activates fill sequence 720, which consists of the background fill only. Fillmap edge 702 activates fill sequence 721, which consists of an opaque grey fill. Fillmap edge 703 activates fill sequence 722, which consists of a transparent diagonally hatched fill and an opaque grey fill. Fillmap edge 704 activates fill sequence 723, which consists of a transparent diagonally hatched fill and a background fill.

Similarly for fillmap tile 710 of z-band 630, fillmap edge 711 activates fill sequence 720, which consists of the background fill only. Fillmap edge 712 activates fill sequence 724, which consists of a transparent vertically hatched fill and a background fill. Fillmap edge 713 activates fill sequence 725, which consists of a transparent vertically hatched fill and an opaque grey fill. Fillmap edge 714 activates fill sequence 721, which consists of an opaque grey fill. Fillmap edge 715 activates fill sequence 720, which consists of the background fill only. Note that, while the fillmap edges of z-bands 620 and 630 are entirely separate, z-bands 620 and 630 share some fill sequences. For example, fill sequences 720 and 721 are referenced by fillmap edges in both fillmap tile 700 and fillmap tile 710.

Once the fillmaps for z-bands 620 and 630 have been generated (by two FG tasks), they are merged by a FM task to produce a final fillmap for the page 605. The process of merging two or more z-band fillmaps is similar to the process of fillmap generation. That is, the edges activating spans of identical fill sequences on consecutive scan lines are joined such that fillmap edges in the resulting fillmap activate regions of identical fill sequences. The fillmap edges of the z-band fillmaps being merged either remain the same in the final fillmap, are split, joined, extended or deleted according the regions in the merged fillmap. In addition, new edges may be created in the final fillmap that did not exist in any of the z-band fillmaps being merged. In the preferred implementation, z-band fillmaps are merged tile-by-tile.

Figure 7B:
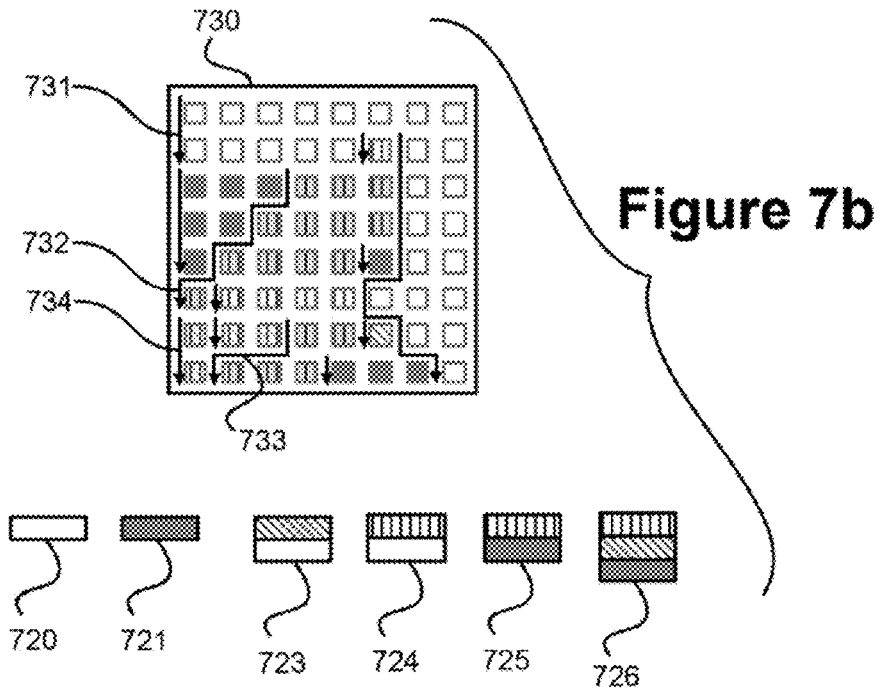

The result of merging the fillmap tiles 700 and 710 is fillmap tile 730, shown in FIG. 7b. Because fillmap tile 710 represents graphic objects 612 and 613 with the largest z-order, fillmap edges from tile 710 are treated as having a larger z-order than fillmap edges from fillmap tile 700 during the fillmap merge process. Fillmap edge 731 activates fill sequence 720, which consists of the background fill only.

Fillmap edges 732 and 733 activate fill sequence 725, which consists of a transparent vertically hatched fill and an opaque grey fill. Fillmap edge 734 activates new fill sequence 726, which consists of a transparent vertically hatched fill, a transparent diagonally hatched fill and an opaque grey fill. Note that fill sequence 722 that was referenced by fillmap edge 703 in z-band fillmap tile 700 is not referenced by any fillmap edge in the merged fillmap 730. The pixels in this region are to be rendered using the new fill sequence 726, which contains the vertically hatched fill that did not appear in z-band 620. Other fillmap edges in the merged fillmap tile 730 reference fill sequences in a similar way.

The final fillmap produced by an FM task represents all graphic objects on the page. This fillmap is equivalent to a fillmap produced by a single FG task for all graphic objects on the page (that is, if no z-banding were done).

Fillmap Builder Execution Example

Figure 8:
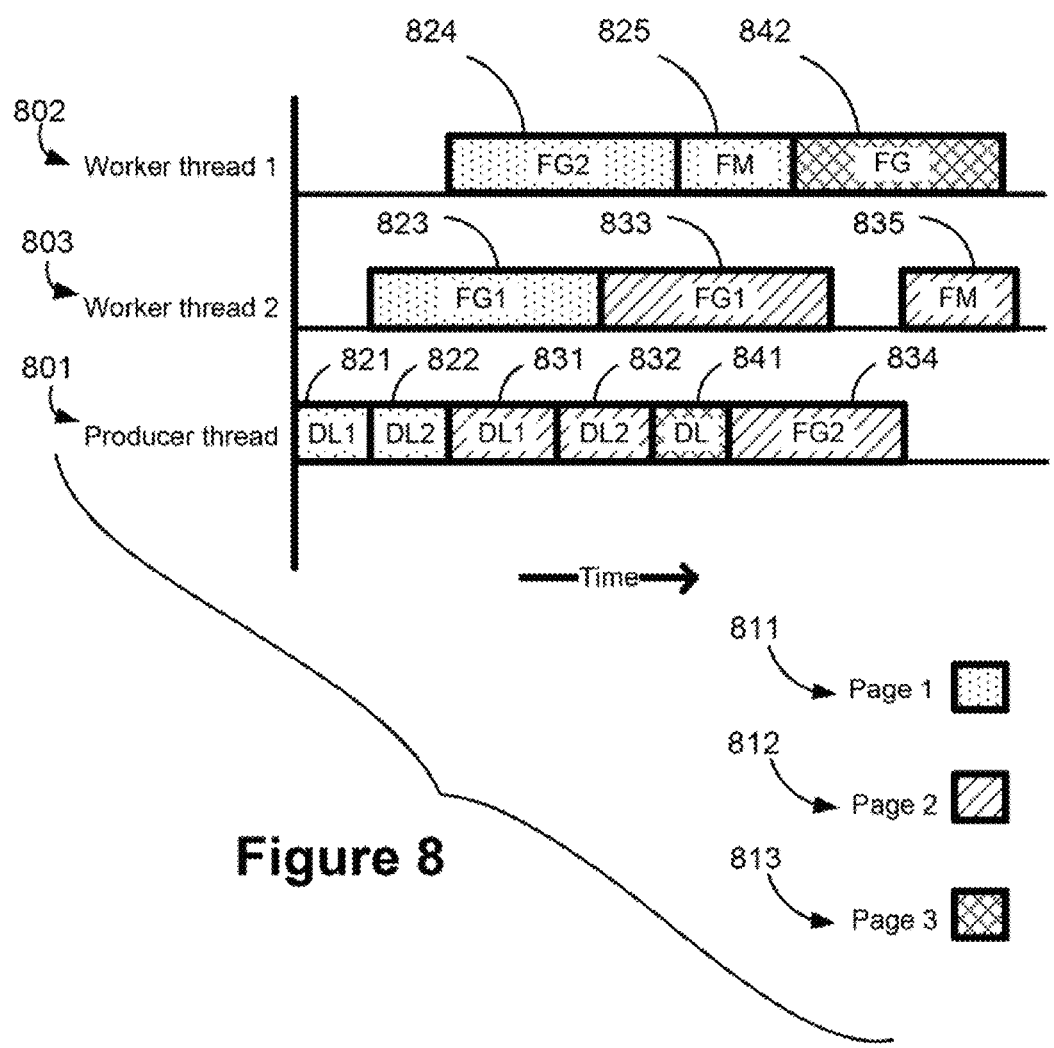
FIG. 8 shows an example of the execution of tasks within the fillmap builder.

FIG. 8 shows an example of the execution of the tasks of the fillmap builder 205 in a multi-threaded system. In this example, the fillmap builder 205 is processing three pages 811-813 using three threads 801-803, where thread 801 is a producer thread and threads 802 and 803 are worker threads. A producer thread executes producer tasks and a worker thread executes worker tasks. Producer tasks generate worker tasks to be consumed or processed by worker threads. Worker tasks in turn generate data to be processed by other worker threads or data to be output by the process. In some implementations, a producer thread can also execute worker tasks.

In an exemplary implementation, DL tasks are producer tasks, and FG tasks and FM tasks are worker tasks. The producer thread 801 executes DL tasks, FG tasks and FM tasks when needed. Worker threads 802 and 803, which may be considered fillmap generating threads (intermediate data generating threads), execute FG tasks and FM tasks exclusively. The FG tasks are fillmap generation tasks (intermediate data generation tasks). In some embodiments, FM tasks could also be considered fillmap generation tasks.

Referring to FIG. 8, the first page 811 is split into two z-bands. The first z-band of the first page 811 is processed using task DL1 821 and task FG1 823. The second z-band of the first page 811 is processed using task DL2 822 and task FG2 824. The z-band fillmaps produced by tasks FG1 823 and FG2 824 are merged by task FM 825 to produce the final fillmap for the first page 811.

The second page 812 is also split into two z-bands. The first z-band of the second page 812 is processed using task DL1 831 and task FG1 833. The second z-band of the second page 812 is processed using task DL2 832 and task FG2 834. The z-band fillmaps produced by tasks FG1 833 and FG2 834 are merged by task FM 835 to produce the final fillmap for the second page 812.

The third page 813 is not split into z-bands, as it contains fewer and/or simpler graphic objects than the first and second pages. Page 813 is therefore processed using a single DL task and a single FG task. As only one FG task is required, no FM task is required. The single display list of the third page 813 is processed using task DL 841. This display list is converted to the final fillmap for the third page 813 using task FG 842.

Dependencies between tasks are illustrated by the example shown in FIG. 8. For example, the task FG1 823 corresponding to the first z-band of the first page 811 cannot begin until the task DL1 821 for this z-band is complete. This is because the task FG 823 takes as input the display list produced by task DL1 821. Similarly, the task FM 825 for the first page 811 cannot begin until both tasks FG1 823 and FG2 824 are completed. This is because the task FM 825 takes as input the z-band fillmaps produced by the tasks FG1 823 and FG2 824. Once an FM task is complete, the final fillmap for the page is passed to renderer 180.

Tasks for different pages are always able to be processed in parallel, as there are no computational dependencies between these tasks. Provided that there are enough system resources, the DL, FG and FM tasks for different pages are able to be executed at the same time. The final fillmaps of these pages could even be produced out of order.

Display List Generation

A process 900 of producing z-band display lists and FG tasks for a page of graphic objects will now be described with reference to FIG. 9. The process 900 is preferably implemented as software as part of the controlling program 140 of the printing system 160, where the software is stored in the memory 190 and executed by the controller processor 170 using the various cores 171-174. Process 900 starts and proceeds to step 901, where a new DL task and display list are created. The display list is stored in variable D_LIST, for example within the memory 190. This DL task will be used to construct the first z-band display list for the page. A DL task processes graphic objects in a sequential manner, based on the order in which they are passed into the DL task. In exemplary implementations, graphic objects are passed in z-order.

Processing then proceeds to step 902, where the controller processor 170 determines from the PDL (e.g. 203) representation of the printable page (e.g. 202) if there are more graphic objects remaining on the page.

If there are more graphic objects remaining on the page, process 900 proceeds to step 903, where the next graphic object on the page is retrieved. Step 903 involves the processor 170 interpreting the PDL representing the page until the next graphic object is completely interpreted. Processing then proceeds to step 904, where the graphic object that was retrieved at step 903 is added to the display list stored in variable D_LIST, which is the display list associated with the current DL task. Step 904 also involves storing the outline and the fill of the graphic object in the memory 109.

Process 900 then proceeds to step 905 where the complexity of an FG task needed to convert D_LIST to a fillmap is estimated by the controller processor 170 and stored in a variable C in the memory 109. The complexity C is the amount of processing load or work required of the FG task. In a preferred implementation, complexity is a value estimated to represent the number of processor/CPU instructions required to execute the FG task. This is related to the duration of the FG task. The estimated value is derived from actual measures associated with complexity, these including the time of execution of the task, the number of CPU cycles taken to complete the task, or the number of retired instructions (NRI) associated with the task, as understood in the art.

The estimation step 905 involves taking various measurements of the display list and its associated graphic objects, such as the total number of graphic objects, the number of transparent graphic objects, the number of edges of the graphic objects, and the degree to which the graphic objects in the display list overlap. Once the necessary display list measurements have been taken, the estimation step 905 estimates the complexity, C. In the preferred implementation, this estimation is performed using a linear function that is derived using a linear regression algorithm with empirical data.

Figure 9:
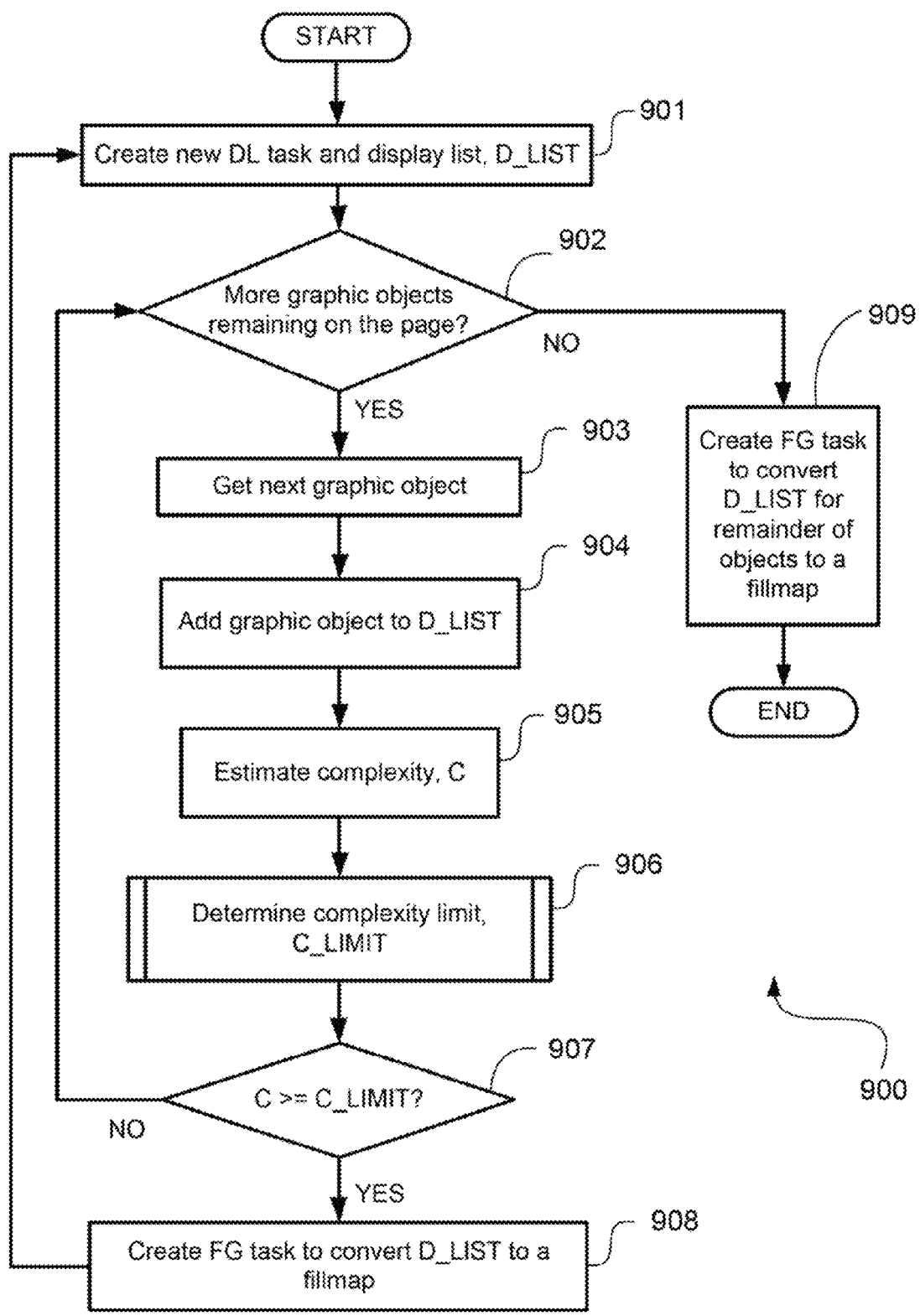
FIG. 9 shows a flow chart of the creation of DL tasks, z-band display lists and FG tasks according to a preferred implementation of dynamic worker task complexity adjustment.

As graphics objects are added to the current display list stored in variable D_LIST, the complexity C is estimated, essentially continuously, for example "on-the-fly" for each graphic object received, as seen in FIG. 9. In one exemplary implementation, the complexity assessment is carried out after the addition of each graphic object to D_LIST, but the frequency and the timing of this assessment can vary. For example, the determination of the complexity C can be performed when every graphic object is received, when every hundredth graphic object is received, periodically in time, or when an event occurs such as task finishing.

Processing then proceeds to step 906, where the complexity limit is determined and stored in variable C_LIMIT. C_LIMIT is an upper limit on the complexity of an FG task. Determining step 906 will be described in more detail later with reference to FIG. 10. Step 906 is performed in one exemplary implementation as part of the DL task on the producer thread. Step 906 can, however, be performed anywhere, including on a different thread which oversees the execution of a multi-threaded RIP system.

Processing then proceeds to decision step 907, where the current complexity, C, determined at step 905, is compared with the complexity limit, C_LIMIT, determined at step 906. If it is decided that C is greater than or equal to C_LIMIT, no more graphic objects will be added to the display list stored in variable D_LIST. In this case, processing proceeds to step 908, where an FG task is created to convert the graphic objects in D_LIST to a fillmap. However, if the controller processor 170 determines that C is less than C_LIMIT, then the processes of checking 902 if there are more graphical objects is repeated. In the event that there are more graphical objects, the graphical object retrieving step 904, object adding step 905, complexity estimation step 906 and comparison step 908 is repeated. On the other hand, if there are no more graphical objects as determined in the checking step 902, process 900 proceeds to step 909, where an FG task is created to convert D_LIST, the display list containing the remainder of the page's graphic objects, into a fillmap. In other words, more graphical objects are added to the D_LIST until either the complexity limit is satisfied or there are no remaining graphical objects in the print job. Step 908 will typically also involve preparing the display list for conversion to a fillmap. The created FG task is started immediately if there is an idle thread on which the created FG task can be executed. Alternatively, if there are no idle threads, the FG task is placed in a queue, for example within the memory 190 to be executed at a later time.

Process 900 then returns to step 901, where a new DL task and associated z-band display list is created.

If, at decision step 907, it is decided that C is not greater than or equal to C_LIMIT, more graphic objects can be added to D_LIST as C_LIMIT has not been exceeded. In such a case, processing then returns to step 902.

If, at step 902, it is determined that there are no more graphic objects remaining on the page, process 900 proceeds to step 909, where an FG task is created to convert D_LIST, the display list containing the remainder of the page's graphic objects, into a fillmap. Upon completion of step 909, the process 900 ends. Process 900 is then be re-started for the next printable page, if there is one.

Figure 10:
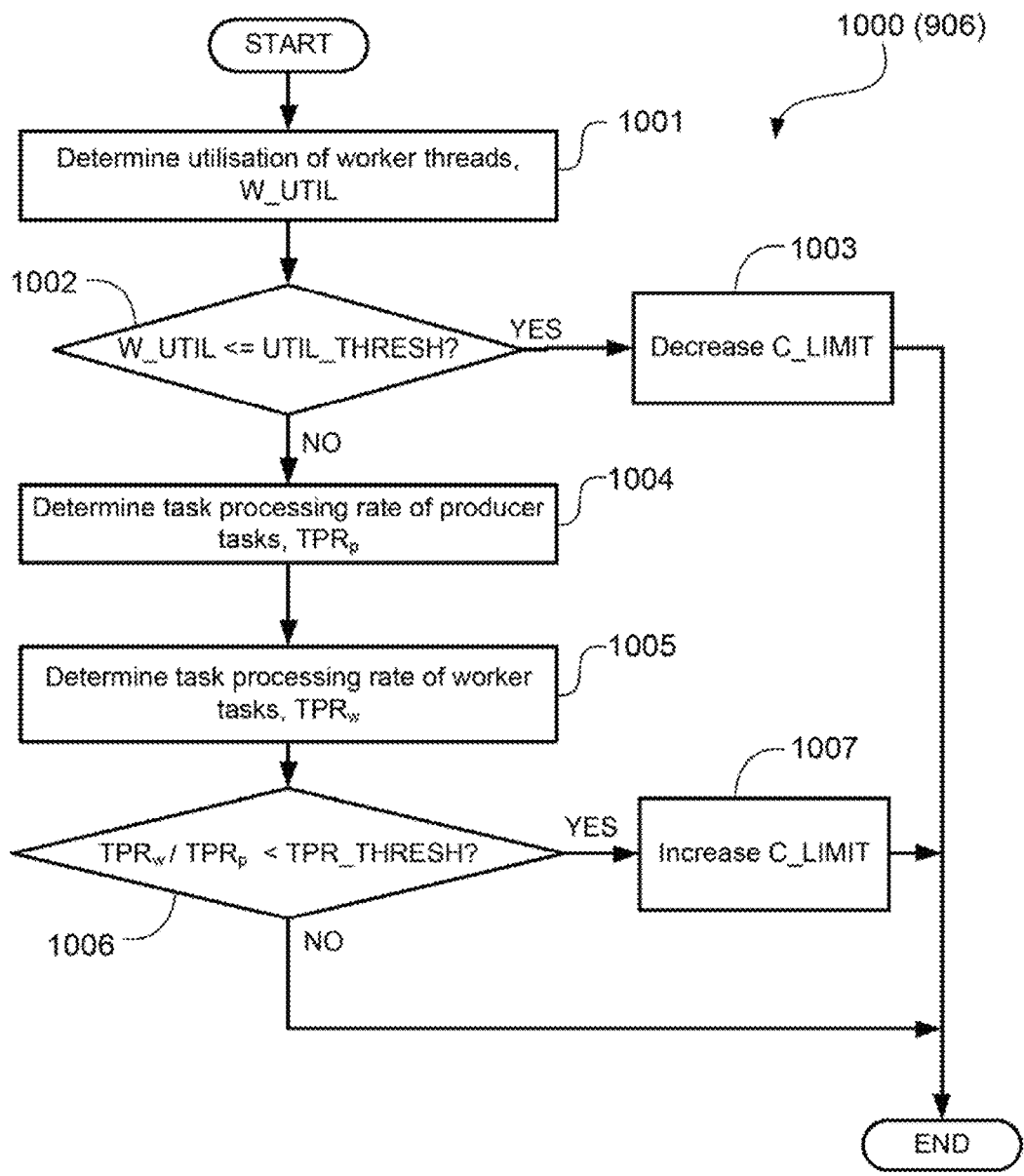
FIG. 10 shows a flow chart of the determination of the complexity limit useful for the process of FIG. 9.

Referring now to FIG. 10, a preferred process 1000 of step 906 for determining the complexity limit will now be described. Process 1000 (906) starts and proceeds to step 1001, where a utilisation measure of the worker threads, in this case including one or more fillmap generating threads, is determined and stored in variable W_UTIL in the memory 190. Utilisation is the percentage of time that a resource is used over a given period of time. This is also commonly known as duty cycle. The utilisation of a single thread is the percentage of time that the single thread has spent executing tasks over a period of time. The period of time is fixed in duration, and ends at the time that the utilisation is being calculated. The utilisation of the worker threads, W_UTIL, is a value derived from the combined utilisation of all worker threads. In the preferred implementation, the utilisation of all worker threads W_UTIL is determined by calculating the average of the utilisation of individual worker threads. For example, in a system with two worker threads with measured utilisation over a period of time of 50% and 70%, respectively, W_UTIL would be 60% for that period of time. In other implementations, W_UTIL could be determined by calculating a median of the utilisations, by calculating a weighted average, or by any other method of combining a group of measurements known in the art.

Process 1000 (906) then proceeds to step 1002, where it is determined if W_UTIL falls below or is equal to a predetermined utilisation threshold UTIL_THRESH. In the preferred implementation, UTIL_THRESH is fixed, and is predetermined based on past executions of the printing system 160.

If, at step 1002, it is determined that W_UTIL is less than or equal to UTIL_THRESH, processing proceeds to step 1003, where the complexity limit C_LIMIT is decreased. In the preferred implementation, the value of C_LIMIT is reduced by subtracting a pre-determined value from the current value of C_LIMIT. The pre-determined value should be large enough to have a substantial effect on the complexity of the worker tasks, but not too large that it drastically changes the behaviour of the fillmap builder. That pre-determined value is either fixed before execution starts or it can be changed dynamically, based on the state of the system measured, for example, by the thread utilisation levels. In other words, the value of C_LIMIT is changed mid-execution as a result of collected system feedback based on system state such as worker thread utilisation. In addition, step 1003 should ensure that the value of C_LIMIT does not fall below a pre-determined minimum value of C_LIMIT, so that the complexity of worker tasks is not too low.

Reducing or decreasing C_LIMIT will cause the DL thread (the producer thread) to generate a larger number of FG tasks (worker tasks) that have lower complexity. The decreased C_LIMIT allows the generation of a simpler display list, which contain less graphical objects to be converted into a fillmap representation. This will have the effect of quickly increasing worker thread utilisation, increasing the number of tasks that are able to be executed in parallel, and ultimately minimising the time required to process all graphic objects that have been received so-far. This has the effect of dividing or extracting portions of the worker tasks and dispersing those portions so as to satisfy the processing load determined by the complexity limit The extracted portions of worker tasks are allocated to the worker threads for processing.

An example of low worker thread utilisation that causes step 1002 to be executed will be described later with reference to FIG. 11*a*. Upon completion of step 1003, process 1000 (906) ends.

If, at step 1002, it is determined that W_UTIL is not less than or equal to UTIL_THRESH, processing proceeds to step 1004, where a task processing rate (TPR) of the producer tasks is determined and stored the memory 190 in a variable $TPR_p$. TPR is the number of tasks completed within a given period of time. The period of time is fixed in duration, and ends at the time that TPR is being calculated. This pre-determined period of time could be, for example, 1 ms, 100 ms, 1 s, or 5 s. The TPR of the producer tasks, $TPR_p$, is the number of producer tasks completed within a given period of time. In the preferred implementation, the producer tasks used to calculate $TPR_p$ includes DL tasks, and other tasks that generate additional worker tasks, such as FM tasks.

The process 1000 (906) then proceeds to step 1005, where the TPR of the worker tasks is determined and stored in the memory 190 in a variable $TPR_w$. $TPR_w$ is calculated by summing the number of worker tasks completed over a pre-determined time period. This pre-determined period of time could be, for example, 1 ms, 100 ms, 1 s, or 5 s. However, in order to be comparable, $TPR_w$ must be calculated over the same period of time as $TPR_p$.

Processing then proceeds to a decision step 1006 where $TPR_w$ is compared with $TPR_p$. Step 1006 determines if the ratio $TPR_w/TPR_p$ is less than a threshold, TPR_THRESH. In a preferred implementation, TPR_THRESH is set to a fixed fractional value that is slightly less than 1, such as 0.9. The two values $TPR_w$ and $TPR_p$ are considered equal at step 1006 if this ratio is greater than or equal to TPR_THRESH. If this ratio is less than TPR_THRESH, $TPR_w$ is considered less than $TPR_p$, indicating that the worker tasks are being processed at a much slower rate than producer tasks.

If the decision step 1006 determines that $TPR_w/TPR_p$ is less than TPR_THRESH, processing proceeds to step 1007. In this scenario, worker tasks are being processed at a much slower rate than producer tasks. This situation is rectified at step 1007, where C_LIMIT is increased. In the preferred implementation, C_LIMIT is increased by adding a pre-determined value to the current value of C_LIMIT. The increased C_LIMIT allows the creation of more complicated display lists which contain more graphical objects. The pre-determined value should be large enough to have a substantial effect on the complexity of the worker tasks, but not so large that it drastically changes the behaviour of the fillmap builder. In addition, step 1007 should ensure that the setting of value of C_LIMIT does exceed a predetermined maximum value of C_LIMIT, so that the complexity of worker tasks is not too high.

Increasing C_LIMIT will cause both fewer producer tasks and fewer worker tasks to be produced, and will therefore reduce the overhead of creating tasks. In addition, because fewer FG tasks will be created, fewer FM tasks will be required to merge z-band fillmaps. Therefore, the overall processing work needing to be performed by the worker threads will be reduced. An example of a scenario where worker tasks are being processed at a much slower rate than producer tasks that causes step 1007 to be executed will be described later with reference to FIG. 11b. Upon completion of step 1007, the process 1000 (906) ends.

If decision step 1006 determines that $TPR_w/TPR_p$ is not less than TPR_THRESH, the current complexity limit is maintained, and the process 1000 (906) ends. In this scenario, it has been determined by process 906 that system resources are being utilised effectively and producer tasks and worker tasks are being processed at roughly the same rate. There is no need to adjust C_LIMIT. An example of a scenario where producer tasks and worker tasks are being processed at roughly the same rate and C_LIMIT is left unchanged will be described later with reference to FIG. 11c.

It must be noted that there are various ways in which the arrangements presently disclosed may be performed and that the process 1000 (906) describes only one preferred implementation of determining a complexity limit of tasks in a multi-threaded printing system. For example, other applications may require different thresholds, or a different sequence of steps for adjusting the complexity limit. The overall aim of task complexity assessment is to dynamically adjust the complexity of worker tasks through the measurement of utilisation and other system state information, and the subsequent adjustment of a complexity limit of worker tasks. Measurement of utilisation may also or alternatively include analysing the future utilisation based on tasks waiting to be processed. The estimated execution time of unprocessed tasks is used to calculate the utilisation of a thread, which is the predicted percentage of time that the thread will spend executing tasks that will be allocated to the thread during a future period of time.

EXAMPLES

Three examples of the use of the processing described above will now be given with reference to FIGS. 11a-11e. FIGS. 11a and 11d show an example of adjusting C_LIMIT when worker thread utilisation, W_UTIL, is low.

Figure 11A:
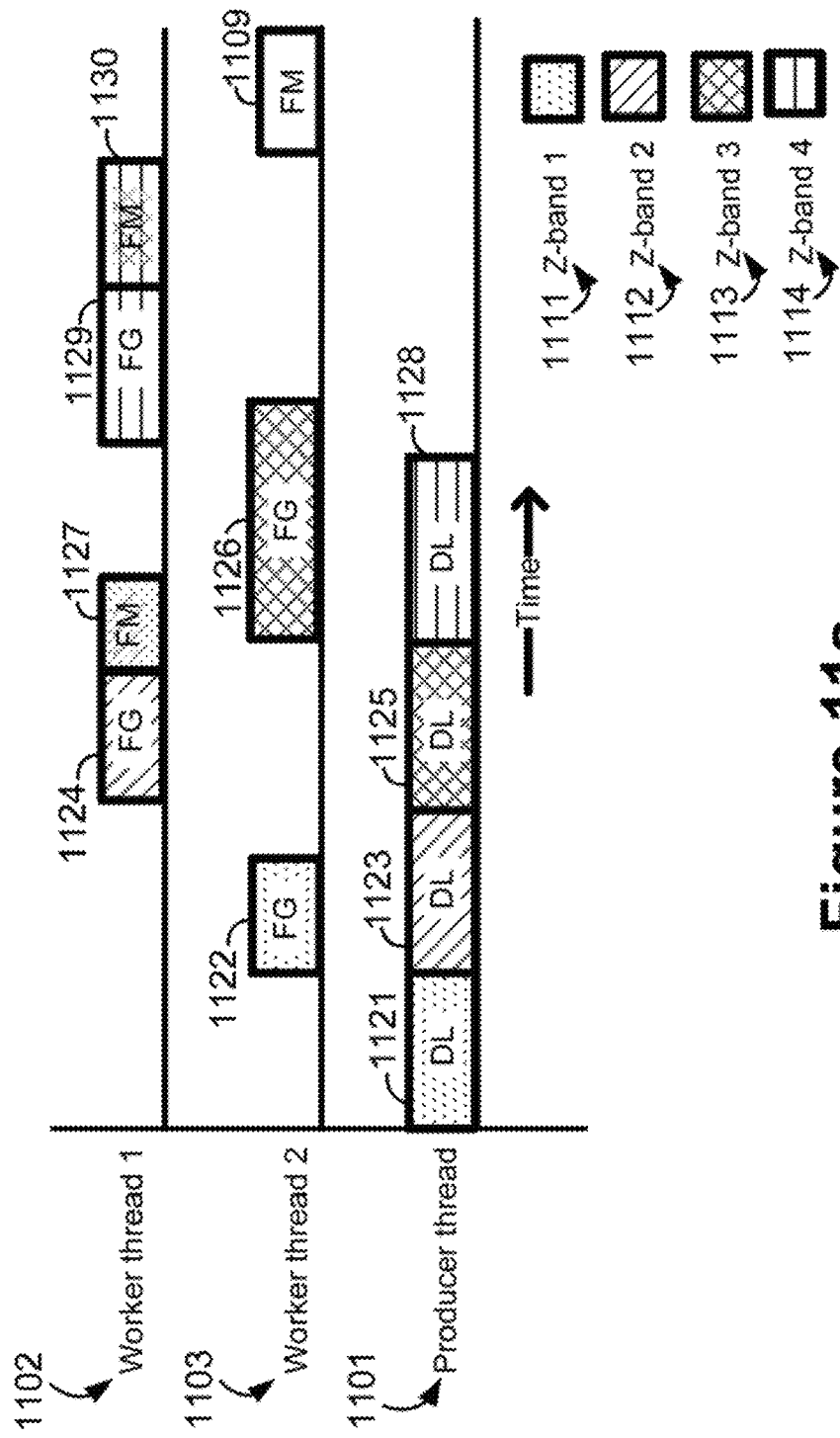
FIG. 11a shows an example of task execution, in which worker thread utilisation is low.

FIG. 11a is a "before" snapshot of processing a page when the arrangements presently disclosed are not applied to manage the complexity of FG tasks. Fillmap builder 205 is using three threads 1101-1103, where thread 1101 is a producer thread and threads 1102 and 1103 are worker threads. Producer thread 1101 therefore executes DL tasks, and worker threads 1102 and 1103 therefore execute FG tasks and FM tasks. The page to be rendered is split into four z-bands 1111-1114. The first z-band 1111 is processed using DL task 1121 and FG task 1122. The second z-band 1112 is processed using DL task 1123 and FG task 1124. The third z-band 1113 is processed using DL task 1125 and FG task 1126. The fourth z-band 1114 is processed using DL task 1128 and FG task 1129. The z-band fillmaps produced by FG tasks 1122 and 1124 are merged by FM task 1127. The z-band fillmaps produced by FG tasks 1126 and 1129 are merged by FM task 1130. The intermediate fillmaps produced by FM task 1127 and FM task 1130 are merged by FM task 1109 to produce the final fillmap for the page.

FIG. 11d is a snapshot of processing the same page of FIG. 11a when the arrangements presently disclosed are used to manage complexity of FG tasks. Applying the present arrangements results in extracting two extra FG tasks to carry out the processing using FG worker tasks as the complexity limit is reduced. Fillmap builder 205 is using three threads 2101-2103, where thread 2101 is a producer thread and threads 2102 and 2103 are worker threads. Producer thread 2101 therefore executes DL tasks, and worker threads 2102 and 2103 therefore execute FG tasks and FM tasks. The page to be rendered is split into six z-bands 2111-2116. The first z-band 2111 is processed using DL task 2121 and FG task 2122. The second z-band 2112 is processed using DL task 2123 and FG task 2124. The third z-band 2113 is processed using DL task 2125 and FG task 2126. The fourth z-band 2114 is processed using DL task 2128 and FG task 2131. The fifth z-band 2115 is processed using DL task 2129 and FG task 2132. The sixth z-band 2116 is processed using DL task 2130 and FG task 2133. The z-band fillmaps produced by FG tasks 2122 and 2124 are merged by FM task 2127. The z-band fillmaps produced by FG tasks 2126 and 2131 are merged by FM task 2137. The z-band fillmaps produced by FG tasks 2132 and 2133 are merged by FM task 2134. The intermediate fillmaps produced by FM task 2127 and FM task 2137 are merged by FM task 2135. The intermediate fillmaps produced by FM task 2134 and FM task 2135 are merged by FM task 2136 to produce the final fillmap for the page.

The steps described previously with reference to FIG. 10, are executed at regular intervals denoted in FIGS. 11a-11e by vertical dashed lines 2100, 2110, 2140, 3100, 3130, 3153, 1190 and 1180. The following description of the steps in FIG. 10 refers to the point in time 2110 in FIG. 11d. By time 2110 the DL task 2121 has completed and the task it has created, FG 2122, has also completed. DL task 2123 is being executed at time 2110.

The process 1000 (906) is executed starting with step 1001 which determines W_UTIL. As seen in FIG. 11*d*, the worker threads 2102 and 2103 have spent very little time executing worker tasks prior to time 2110. A low worker thread utilisation W_UTIL is therefore detected at step 1002, where W_UTIL is compared to the threshold UTIL_THRESH. Step 1003 is then executed, which reduces C_LIMIT, thus creating more tasks that will increase the worker thread utilisation W_UTIL. In the example, W_UTIL is increased from 35% for the time period from time 2100 to time 2110 to 75% for the time period from time 2110 to time 2140. The increase of W_UTIL will in turn reduce the overall time taken to process the page by enabling better worker thread utilisation.

As a direct result from applying the arrangements presently disclosed, six z-bands are processed, instead of four and an extra intermediate merge is required (FM task 2135) before the final fillmap representation is created by FM task 2136. The FM task 2136 merges the intermediate fillmaps created by FM tasks 2134 and 2135.

Figure 11B:
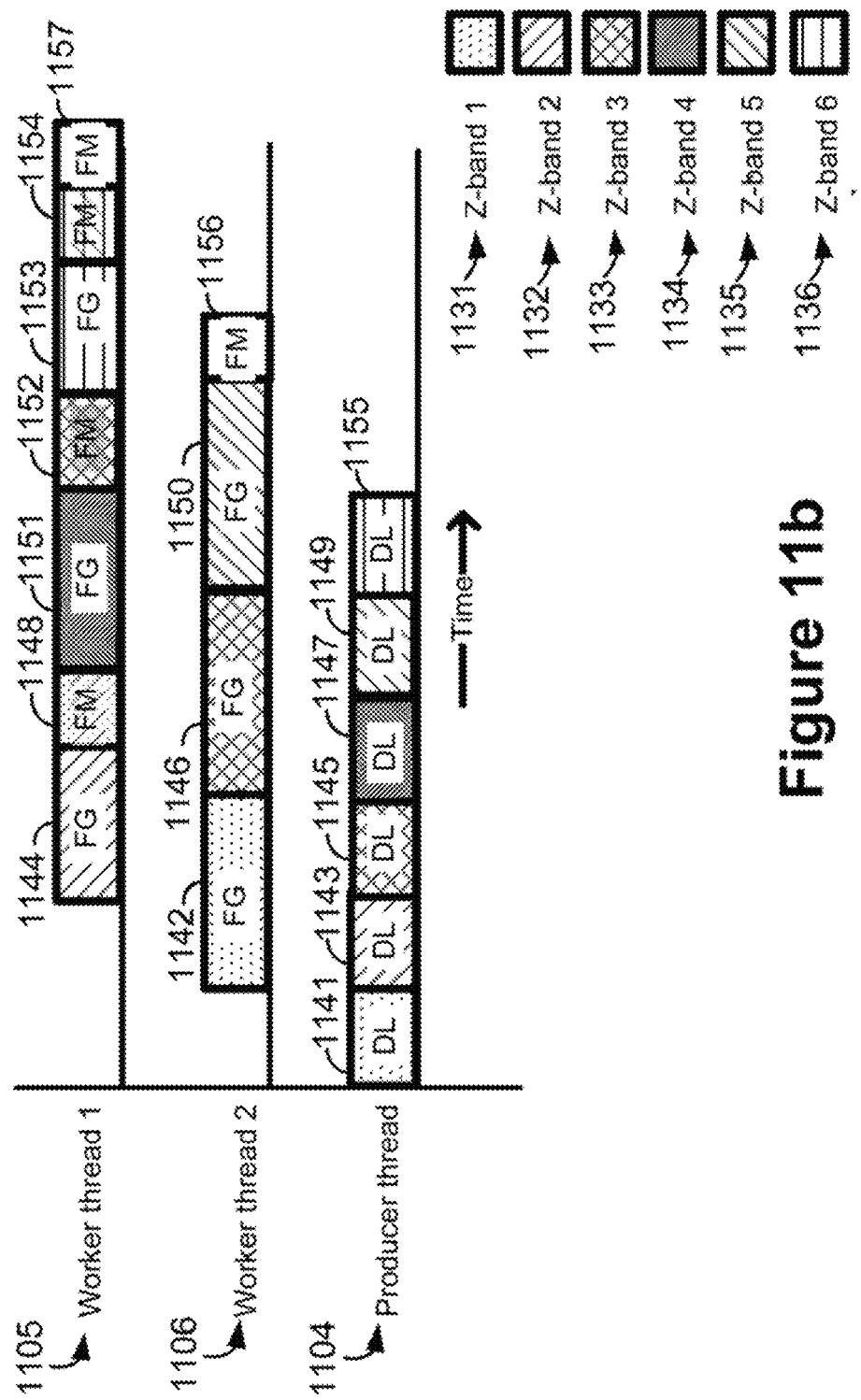
FIG. 11b shows an example of task execution, in which worker thread utilisation is high and the task processing rate of the worker tasks is low.
Figure 11C:
FIG. 11c shows an example of task execution, in which worker thread utilisation is high and the task processing rate of the worker tasks is high.
Figure 11D:
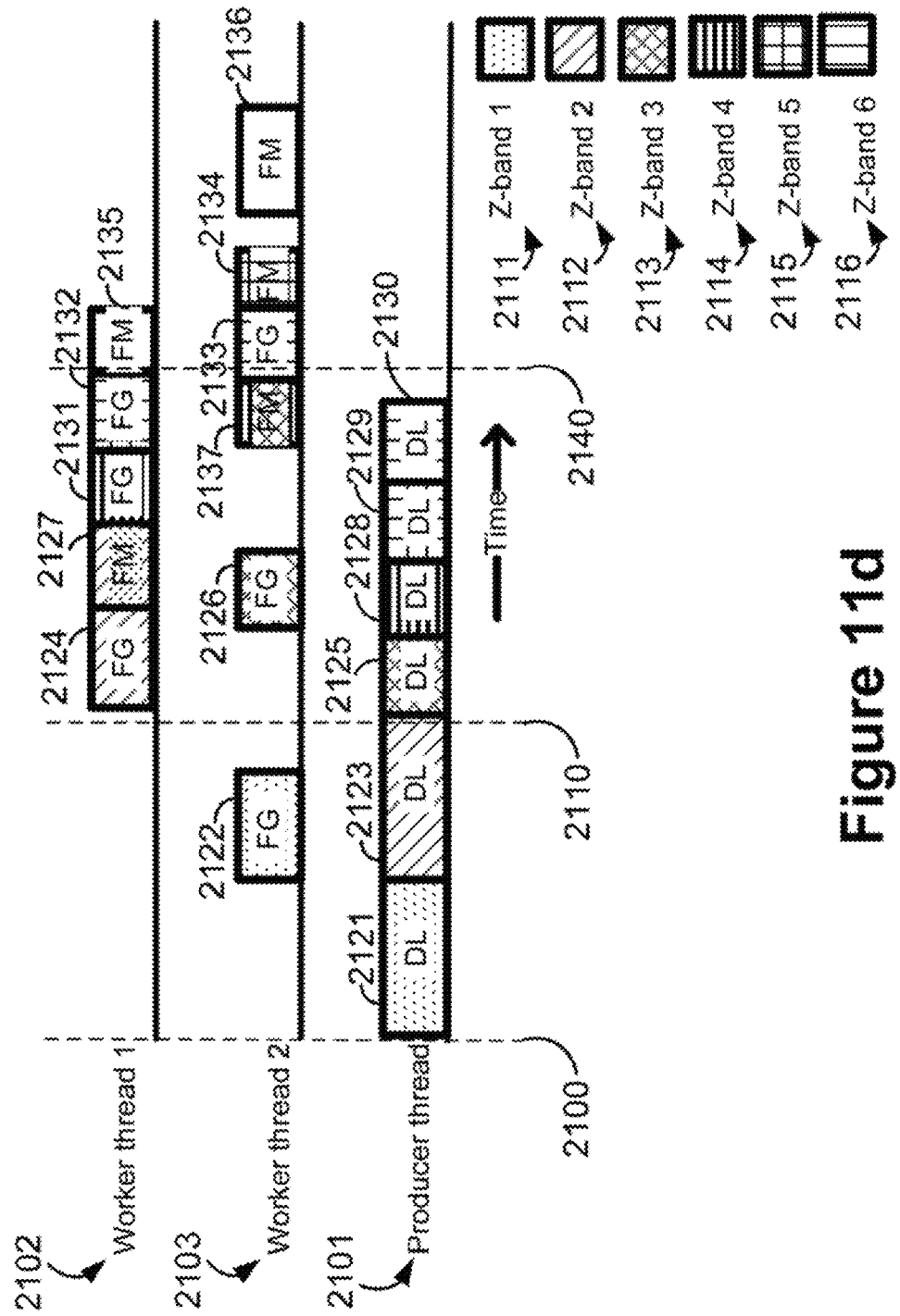
Figure 11E:
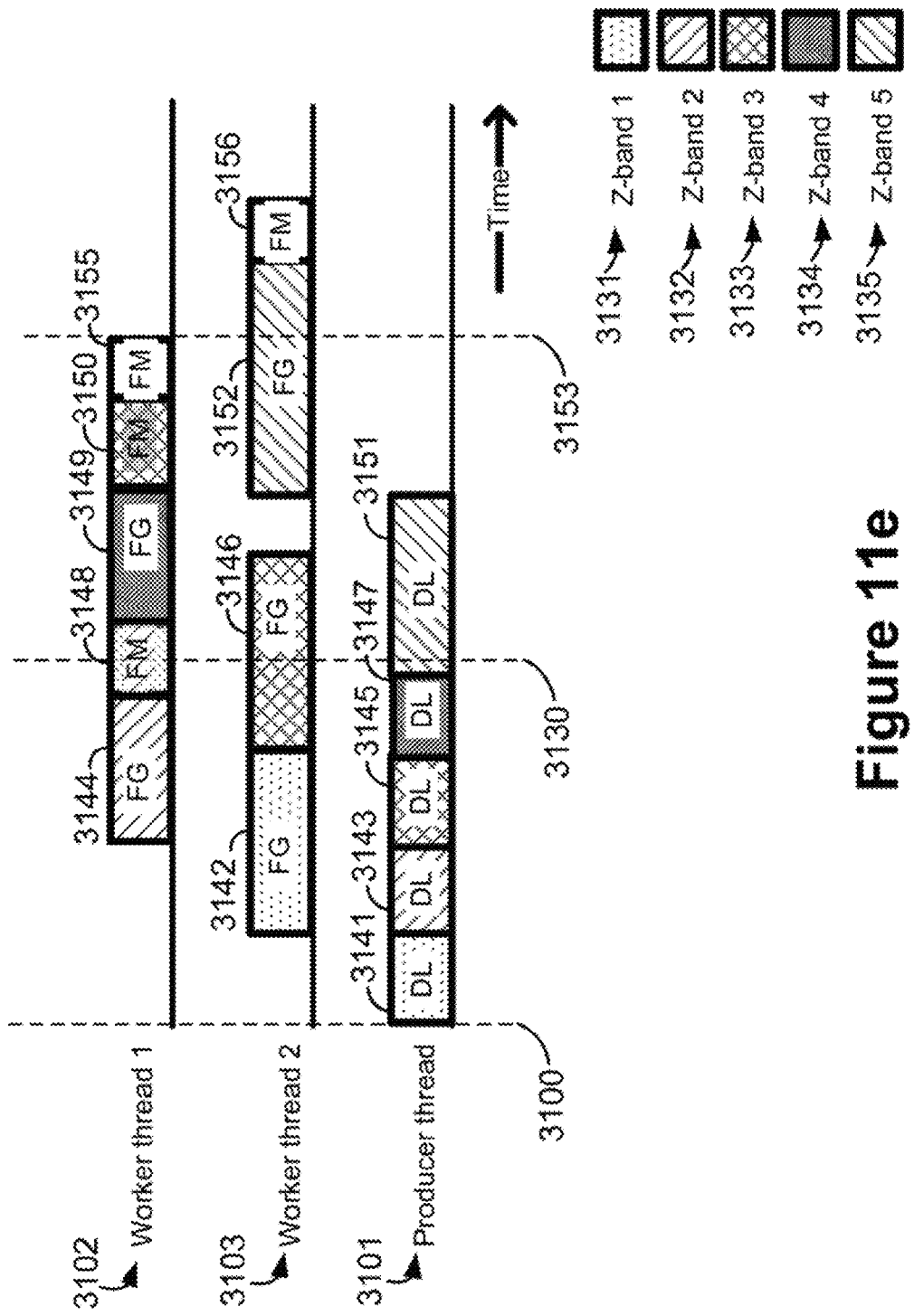
FIG. 11e represents a result of applying the presently disclosed arrangements to the situation of FIG. 11b.

FIGS. 11*b* and 11*e* show an example of adjusting C_LIMIT when worker thread utilisation W_UTIL is high, but $TPR_w$ is low in comparison to $TPR_p$. FIG. 11*b* is a "before" snapshot of processing a page when the invention is not applied to manage the complexity of FG tasks. The fillmap builder 205 is using three threads 1104-1106, where thread 1104 is a producer thread and threads 1105 and 1106 are worker threads. Producer thread 1104 therefore executes DL tasks, and worker threads 1105 and 1106 therefore execute FG tasks and FM tasks. In this example, the page being rendered is segmented into six z-bands 1131-1136. The first z-band 1131 is processed using DL task 1141 and FG task 1142. The second z-band 1132 is processed using DL task 1143 and FG task 1144. The third z-band 1133 is processed using DL task 1145 and FG task 1146. The fourth z-band 1134 is processed using DL task 1147 and FG task 1151. The fifth z-band 1135 is processed using DL task 1149 and FG task 1150. The sixth z-band 1136 is processed using DL task 1155 and FG task 1153. The z-band fillmaps produced by FG tasks 1142 and 1144 are merged by FM task 1148. The z-band fillmaps produced by FG tasks 1146 and 1151 are merged by FM task 1152. The z-band fillmaps produced by FG tasks 1150 and 1153 are merged by FM task 1154. FM task 1156 merges the intermediate fillmaps produced by FM task 1148 and FM task 1152. The final fillmap of the page is created by FM 1157 by merging the fillmaps created by FM tasks 1154 and 1156.

FIG. 11*e* is a snapshot of processing the page from FIG. 11*b* when the presently disclosed arrangements are used to manage complexity of FG tasks. Applying the present arrangements results in extracting one less FG task to carry out the processing using FG worker tasks as the complexity limit is increased. The fillmap builder 205 is using three threads 3101-3103, where thread 3101 is a producer thread and threads 3102 and 3103 are worker threads. Producer thread 3101 therefore executes DL tasks, and worker threads 3102 and 3103 therefore execute FG tasks and FM tasks. In this example, the page being rendered is segmented into five z-bands 3131-3135. The first z-band 3131 is processed using DL task 3141 and FG task 3142. The second z-band 3132 is processed using DL task 3143 and FG task 3144. The third z-band 3133 is processed using DL task 3145 and FG task 3146. The fourth z-band 3134 is processed using DL task 3147 and FG task 3149. The fifth z-band 3135 is processed using DL task 3151 and FG task 3152. The z-band fillmaps produced by FG tasks 3142 and 3144 are merged by FM task 3148. The z-band fillmaps produced by FG tasks 3146 and 3149 are merged by FM task 3150. The intermediate fillmaps produced by FM tasks 3148 and 3150 are merged by FM task 3155. The final fillmap of the page is created by FM task 3156 by merging the fillmaps created by FM task 3155 and FG task 3152.

The steps described previously with reference to FIG. 10, are executed at a point in time 3130 denoted by the dashed line in FIG. 11*e*. At time 3130, the TPR of the worker threads, $TPR_w$, is 2, which low in comparison to the TPR of the producer thread, $TPR_p$, which is 4. That is, tasks are being produced at a much faster rate than they are being consumed. In this case, the worker threads are a bottleneck in the system.

In this example, process 1000 (906) for determining the complexity limit is executed starting with step 1001, which determines W_UTIL. A high worker thread utilisation W_UTIL is detected at step 1002 when W_UTIL is compared to the threshold UTIL_THRESH.

Steps 1004 and 1005 then proceed to determine $TPR_p$ and $TPR_w$, respectively. In the example shown in FIG. 11*e*, $TPR_p$ is equal to 4, and $TPR_w$ is equal to 2 (four and two completed tasks respectively). Step 1006 checks whether $TPR_w/TPR_p$ is less than TPR_THRESH which has been pre-set to 0.9. In this example, $TPR_w/TPR_p$ is equal to 0.5. Therefore, if TPR_THRESH is set to 0.9, step 1007 is then executed, which increases C_LIMIT. This will increase the complexity of the worker tasks created, and will reduce the overhead of creating both producer and worker tasks. In addition, this change will reduce the number of FM tasks required and the duration of those FM tasks. This will in turn reduce the amount of work for the worker threads and reduce overall time taken to process the page. As a result, if increasing the complexity limit of FG tasks, less merge tasks are executed, as 5 z-bands instead of 6 z-bands are created and there is no need for the extra intermediate merge in the "before" snapshot executed by FM task 1156 in FIG. 11*b*. The increase of the complexity limit at time 3130 results in larger FG tasks (e.g. FG task 3152).

FIG. 11*c* shows an example when worker thread utilisation W_UTIL is high, but $TPR_w$ is roughly equal to $TPR_p$. In this example, the fillmap builder 205 is using three threads 1191-1193, where thread 1191 is a producer thread and threads 1192 and 1193 are worker threads. Producer thread 1191 therefore executes DL tasks, and worker threads 1192 and 1193 therefore execute FG tasks and FM tasks. FG task 1173 has been created by a DL task not shown on the figure as it has completed before time 1190. In this example, the page being rendered is segmented into five z-bands 1181-1185. The first z-band 1181 is processed using DL task 1161 and FG task 1162. The second z-band 1182 is processed using DL task 1163 and FG task 1164. The third z-band 1183 is processed using DL task 1165 and FG task 1166. The fourth z-band 1184 is processed using DL task 1167 and FG task 1168. The fifth z-band 1185 is processed using DL task 1169 and an FG task 1170. The z-band fillmaps produced by FG tasks 1162 and 1164 are merged by FM task 1175. The z-band fillmaps produced by FG tasks 1166 and 1168 are merged by FM task 1177. The z-band fillmaps produced by FG tasks 1173 and 1170 are merged by FM task 1176. FM task 1174 merges the intermediate fillmaps produced by FM task 1175 and FM task 1176. The final fillmap of the page is created by FM 1179 by merging the fillmaps created by FM tasks 1177 and 1174.

For example, the steps described previously with reference to FIG. 10, are executed at a point in time 1180 denoted by the dashed line in FIG. 11*c*. The process 1000 (906) is executed starting with step 1001 which determines W_UTIL. As seen in FIG. 11*c*, the worker threads 1192 and 1193 have spent a large proportion of time executing tasks in the period of time prior to time 1180. A high worker thread utilisation W_UTIL is therefore detected at step 1002 when W_UTIL is compared to the threshold UTIL_THRESH.

Steps 1004 and 1005 then proceed to determine $TPR_p$ and $TPR_w$, respectively. In the example shown in FIG. 11c, $TPR_p$ is equal to 4, and $TPR_w$ is equal to 5 (four and five completed tasks, respectively). Step 1006 checks whether $TPR_w/TPR_p$ is less than TPR_THRESH. In this example, $TPR_w/TPR_p$ is equal to 1.25. Therefore, if TPR_THRESH is set to 0.9, the process 1000 (906) ends. This results in C_LIMIT not being adjusted. In this scenario, it is determined that the fillmap builder is running in an optimal manner that is making good use of resources. It is therefore not necessary to change C_LIMIT.

INDUSTRIAL APPLICABILITY

The arrangements described are applicable to the computer and data processing industries and particularly for the efficient management of threads in a multiprocessor environment. The arrangements are particularly applicable to the generation of fills and fillmaps in graphic object page rendering. Whilst described particularly to rendering PDLs, the presently disclosed arrangements are useful for optimised processing of generic data items.

The foregoing describes only some embodiments of the present invention, and modifications and/or changes can be made thereto without departing from the scope and spirit of the invention, the embodiments being illustrative and not restrictive.

The claims defining the invention are as follows:

1. A method of allocating tasks for rendering a page based on a print job in a multi-threaded system, the method comprising:
   (a) receiving at least one graphical object from the print job to produce an intermediate data generation task;
   (b) determining a utilisation rate of an intermediate data generating thread based on a plurality of tasks being processed by said intermediate data generating thread over a period of time;
   (c) determining a complexity limit to limit a processing load of the intermediate data generation task to be allocated to the intermediate data generating thread, the complexity limit being decreased if the determined utilisation rate is below a predetermined threshold;
   (d) comparing a processing load of the intermediate data generation task to be allocated with the determined complexity limit; and
   (e) allocating the intermediate data generation task to the intermediate data generating thread for processing in an event that the processing load of the intermediate data generation task satisfies the complexity limit.

2. A method according to claim 1 where, in the event that the processing load of the intermediate data generation task does not satisfy the complexity limit, the method comprises extracting a portion of the intermediate data generation task as a new task and assigning that new task to an intermediate data generation thread, and repeating (d) and (e) for the remaining portion of the intermediate data generation task to be allocated.

3. A method according to claim 1, wherein the processing load of the intermediate data generation task is determined based on a complexity value associated with a number of instructions required to execute an intermediate data generation task.

4. A method according to claim 3, wherein the complexity value is estimated from measures associated with complexity, the measures being one of time of execution of the intermediate data generation task, the number of CPU cycles taken to complete the intermediate data generation task, or the number of retired instructions (NRI) associated with the intermediate data generation task.

5. A method according to claim 1, further comprising:
   determining a task processing measure, where the utilisation measure is greater than the utilisation threshold; and
   using the determined task processing measure to one of maintain or increase the complexity limit.

6. A method according to claim 1, comprising:
   determining a first task processing rate of producer tasks to produce the intermediate data generation tasks and a second task processing rate of the intermediate data generation tasks;
   comparing a ratio of the second rate to the first rate with a predetermined rate threshold; and
   increasing the complexity limit where the ratio is less than the threshold.

7. A method according to claim 1, wherein the utilisation measure is determined by calculating one of an average, a median, or a weighted average, of the utilisation of individual intermediate data generating threads, where the utilisation of a single intermediate data generating thread is the percentage of time that the single thread has spent executing tasks over a period of time.

8. A method according to claim 7, wherein the utilisation of a single thread includes a predicted percentage of time that the single intermediate data generating thread spends executing tasks that are allocated to the thread during a pre-determined future period of time.

9. A method according to claim 1, further comprising:
   merging intermediate data generated from the intermediate data generation tasks if intermediate tasks are produced separately for a page.

10. A method of allocating tasks for rendering a page based on a print job in a multi-threaded rendering system, the method comprising:
   receiving at least one graphical object from the print job to produce a worker task to be allocated;
   determining a utilisation rate of a worker thread based on a plurality of tasks being processed by said worker thread over a period of time;
   determining a complexity limit to limit a processing load of a worker task to be allocated to the worker thread, the complexity limit being decreased if the determined utilisation rate is below a predetermined threshold;
   comparing a processing load of the worker task to be allocated with the determined complexity limit; and
   allocating the worker task satisfying the determined complexity limit to the worker thread in an event that the processing load of the worker task satisfies the determined complexity limit.

11. A method according to claim 10, further comprising:
   determining a producer task processing rate of producer tasks to produce the worker tasks and a worker task processing rate of worker tasks;
   comparing a ratio of the worker task processing rate to the producer task processing rate with a predetermined rate threshold; and
   increasing the complexity limit where the ratio is less than the threshold.

12. A non-transitory computer readable storage medium having a program recorded thereon, the program being executable by a processor to implement a method of allocating tasks for rendering a page based on a print job in a multi-threaded system, the method comprising:
   (a) receiving at least one graphical object from the print job to produce an intermediate data generation task;

(b) determining a utilisation rate of an intermediate data generating thread;
(c) determining a complexity limit to limit a processing load of the intermediate data generation task to be allocated to the intermediate data generating thread, the complexity limit being decreased if the determined utilisation rate is below a predetermined threshold;
(d) comparing a processing load of the intermediate data generation task to be allocated with the determined complexity limit; and
(e) allocating the intermediate data generation task to the intermediate data generating thread for processing in an event that the processing load of the intermediate data generation task satisfies the complexity limit.

13. A non-transitory computer readable storage medium according to claim 12, having a program recorded thereon that when executed implements a method further comprising:
determining a first task processing rate of producer tasks to produce the intermediate data generation tasks and a second task processing rate of the intermediate data generation tasks;
comparing a ratio of the second rate to the first rate with a predetermined rate threshold; and
increasing the complexity limit where the ratio is less than the threshold.

14. A non-transitory computer readable storage medium according to claim 12, having a program recorded thereon that when executed implements a method further comprising:
merging intermediate data together if intermediate tasks are produced for a page separately.

15. A non-transitory computer readable storage medium having a program recorded thereon, the program being executable by a processor to implement a method of allocating tasks for rendering a page based on a print job in a multi-threaded rendering system, the method comprising:
receiving at least one graphical object from the print job to produce a worker task to be allocated;
determining a utilisation rate of a worker thread based on a plurality of tasks being processed by said worker thread over a period of time;
determining a complexity limit to limit a processing load of the worker task to be allocated to the worker thread, the complexity limit being decreased if the determined utilisation rate is below a predetermined threshold;
comparing a processing load of the worker task to be allocated with the determined complexity limit; and
allocating the worker task satisfying the determined complexity limit to the worker thread in an event that the processing load of the worker task satisfies the determined complexity limit.

16. A non-transitory computer readable storage medium according to claim 15, having a program recorded thereon that when executed implements a method further comprising:
determining a producer task processing rate of producer tasks to produce the worker tasks and a worker task processing rate of worker tasks;
comparing a ratio of the worker task processing rate to the producer task processing rate with a predetermined rate threshold; and
increasing the complexity limit where the ratio is less than the threshold.

* * * * *